US010812756B2

United States Patent
Hu

(10) Patent No.: US 10,812,756 B2
(45) Date of Patent: Oct. 20, 2020

(54) MOVEMENT DETECTION CIRCUIT, MOTION ESTIMATION CIRCUIT, AND ASSOCIATED MOVEMENT DETECTION METHOD CAPABLE OF RECOGNIZING MOVEMENT OF OBJECT IN BACKGROUND

(71) Applicant: NOVATEK MICROELECTRONICS CORP., HsinChu (TW)

(72) Inventor: Jen-Huan Hu, Taipei (TW)

(73) Assignee: NOVATEK MICROELECTRONICS CORP., Hsinchu (TW)

(*) Notice: Subject to any disclaimer, the term of this patent is extended or adjusted under 35 U.S.C. 154(b) by 0 days.

(21) Appl. No.: 16/278,759

(22) Filed: Feb. 19, 2019

(65) Prior Publication Data

US 2020/0267348 A1 Aug. 20, 2020

(51) Int. Cl.
H04N 7/14 (2006.01)
H04N 19/513 (2014.01)
H04N 19/577 (2014.01)
H04N 5/00 (2011.01)
H04N 7/00 (2011.01)
H04N 7/01 (2006.01)
H04N 5/14 (2006.01)

(52) U.S. Cl.
CPC .......... H04N 7/014 (2013.01); H04N 5/145 (2013.01); H04N 7/013 (2013.01); H04N 19/513 (2014.11); H04N 19/577 (2014.11)

(58) Field of Classification Search
None
See application file for complete search history.

(56) References Cited

U.S. PATENT DOCUMENTS

| 7,142,600 B1* | 11/2006 | Schonfeld | H04N 19/51 375/240.16 |
|---|---|---|---|
| 2010/0208820 A1* | 8/2010 | Huang | H04N 19/56 375/240.16 |
| 2010/0226436 A1* | 9/2010 | Dane | H04N 19/139 375/240.16 |
| 2015/0110171 A1* | 4/2015 | Kim | H04N 19/105 375/240.02 |
| 2016/0127678 A1* | 5/2016 | Zhang | H04N 19/527 348/441 |
| 2017/0347099 A1* | 11/2017 | Johar | H04N 19/57 |

* cited by examiner

*Primary Examiner* — Edemio Navas, Jr.
(74) *Attorney, Agent, or Firm* — McClure, Qualey & Rodack, LLP

(57) ABSTRACT

A movement detection circuit, a motion estimation circuit and associated movement detection method are provided. The movement detection circuit includes a candidate searching module including a first-frame and a second-frame candidate circuits, an object selection module including a first selection circuit, a second selection circuit, and a motion vector calculation circuit. The first-frame and the second-frame candidate circuits respectively locate a first and a second first-frame candidate positions in the first frame and locates a first and a second second-frame candidate positions in the second frame. The first-frame object selection circuit identifies one of the first and the second first-frame candidate positions as a first-frame object position, and the second-frame object selection circuit identifies one of the first and the second second-frame candidate positions as a second-frame object position. An object motion vector representing movement of an object based on the first-frame and the second-frame object positions is calculated.

20 Claims, 17 Drawing Sheets

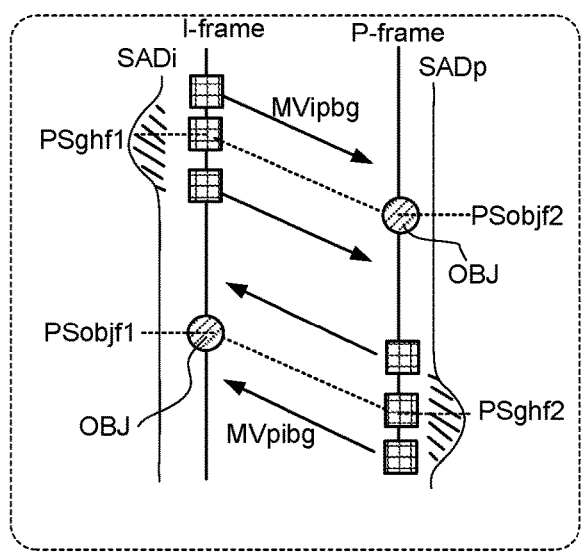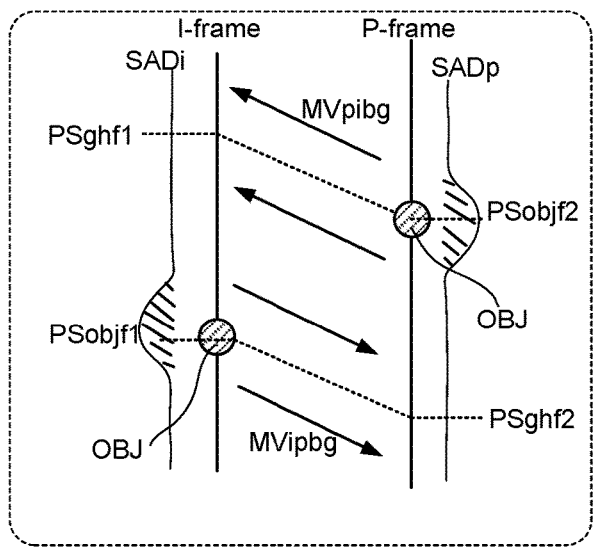
FIG. 8A
FIG. 8B

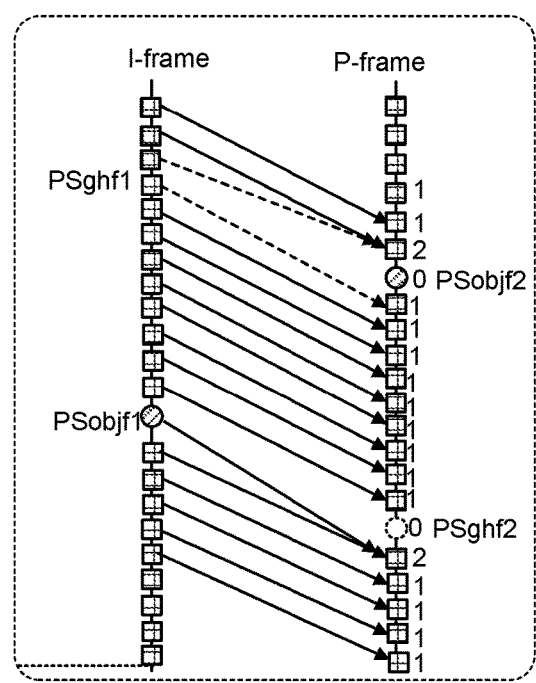
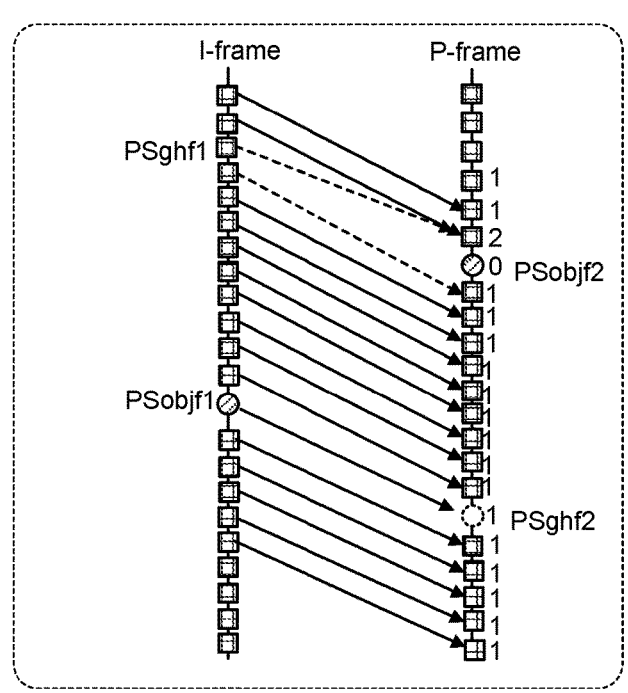
FIG. 19A
FIG. 19B

MOVEMENT DETECTION CIRCUIT, MOTION ESTIMATION CIRCUIT, AND ASSOCIATED MOVEMENT DETECTION METHOD CAPABLE OF RECOGNIZING MOVEMENT OF OBJECT IN BACKGROUND

TECHNICAL FIELD

The disclosure relates in general to a movement detection circuit, a motion estimation circuit, and an associated movement detection method, and more particularly to a movement detection circuit, a motion estimation circuit, and an associated movement detection method capable of recognizing the movement of an object in the background.

BACKGROUND

Due to consideration such as storage space, bandwidth and so forth, videos are captured at a lower frame rate but played at a higher frame rate. Video devices and systems thus need to provide a frame rate conversion (FRC) function.

FIGS. 1A and 1B (prior art) schematically show a process for the frame rate conversion function. FIG. 1A represents source frames OF1~OF5 being captured in sequence, with a capturing interval T between every two source frames OF1~OF5. The capturing interval T can be, for example, 1/24 second, 1/30 second, or 1/60 second.

In FIG. 1B, the video being capered at 60 frames per second (FPS) is assumed to be converted to be displayed at 120 frames per second. In such case, the capturing interval T is equivalent to 1/60 second. Contents of the interpolated frames MF1~MF4 can be acquired by analyzing two source frames OF1~OF5 to be displayed on the screen. That is, interpolated frames MF1~MF4 are middle states of their neighbor source frames OF1~OF5 which are estimated through calculation. The interpolated frames MF1~MF4 are generated and inserted in between every two source frames OF1~OF5.

In consequence, the interpolated interval between one source frame OF1~OF5 and its next interpolated frame MF1~MF4 is equivalent to T/2=1/120 second. To improve the user experience, successfully obtaining a smoother video by increasing the frame rate (that is, frame rate up-conversion) is necessary. Therefore, the interpolated interval may be T/3, T/4 or shorter in some applications.

The main challenge in frame rateup-conversion is how to efficiently and correctly perform motion estimation (ME) and produce the interpolated frames (M-frame) using motion compensation (MC). Nowadays, motion estimation and motion compensation techniques are widely used in video devices and systems.

In FIGS. 1A and 1B, a moving object 10 in the source frames OF1~OF5 and the interpolated frames MF1~MF4 is shown. In the context, movement of the object 10 can be represented as an object motion vector MVobj.

Due to efficiency consideration, generation of the object motion vector MVobj usually refers to motion vectors of pixels nearby the object 10. Therefore, the motion estimation (ME) may directly use background motion vector MVbg to represent the object motion vector MVobj.

For the sake of illustration, the video showing a football match can be taken as an example. The background motion vector MVbg can be considered as the movement of a grass field, and the object motion vector MVobj can be considered as the movement of a ball. Obviously, movement of the grass field cannot represent movement of the ball and purely substituting the object motion vector MVobj with the background motion vector MVbg results in the disappearance of the object 10 in the interpolated frames MF1~MF6. Alternatively speaking, reference to the background motion vector MVbg may cause the motion estimation techniques incorrectly generate the object motion vector MVobj and the object 10 may disappear in the interpolated frames MF1~MF6, especially for the object 10 being relatively small.

If the object motion vector MVobj is incorrect, positions of the object shown in the interpolated frames MF1~MF4 are erroneouss. Consequentially, such erroneous interpolated frames bring the uncomfortable experience of the viewer. Therefore, capable of correctly detecting the object motion vector MVobj in frame rate up-conversion is desired.

SUMMARY

The disclosure is directed to a movement detection circuit, a motion estimation circuit, and an associated movement detection method. The movement detection circuit is capable of detecting movement of an object so that an interpolated frame between a first frame and a second frame can be smoothly displayed.

According to one embodiment, a movement detection circuit for detecting movement of an object in continual frames is provided. A movement detection circuit includes a candidate searching module, an object selection module, and a motion vector calculation circuit. The candidate searching module includes a first frame candidate circuit and a second-frame candidate circuit. The first-frame candidate circuit locates a first first-frame candidate position and a second first-frame candidate position in a first frame based on a first-frame similarity measure distribution at a current time. The second-frame candidate circuit locates a first second-frame candidate position and a second second-frame candidate position in a second frame based on a second-frame movement characteristic at the current time. The object selection module is electrically connected to the candidate searching module. The object selection module includes a first-frame object selection circuit and a second-frame object selection circuit. The first-frame object selection circuit is electrically connected to the first-frame candidate circuit. The first-frame selection circuit identifies which of the first and the second first-frame candidate positions is a first-frame object position representing a position of the object in the first frame according to the first-frame similarity measure distribution time and another second-frame movement characteristic at a previous time. The second-frame object selection circuit is electrically connected to the second-frame candidate circuit and the first-frame object selection circuit. The second-frame object selection circuit identifies which of the first and the second second-frame candidate positions is a second-frame object position representing a position of the object in the second frame according to the first-frame similarity measure distribution and the second-frame movement characteristic. The motion vector calculation circuit is electrically connected to the object selection module. The motion vector calculation circuit calculates an object motion vector representing the movement of the object between the first frame and the second frame based on the first-frame and the second-frame object positions.

According to another embodiment, a motion estimation circuit is provided. The motion estimation circuit includes a background vector generator, a motion vector selection circuit, and a movement detection circuit. The background motion vector generator generates a plurality of motion vectors representing movement of image content between a plurality of first-frame blocks in a first frame and a plurality of second-frame blocks in a second frame. The plurality of motion vectors include a plurality of temporal motion vectors related to the plurality of first-frame blocks and the plurality of second-frame blocks and a plurality of spatial motion vectors related to the plurality of second-frame blocks. The motion vector selection circuit is electrically connected to the background motion vector generator. The motion vector selection circuit generates a plurality of candidate motion vectors based on the plurality of spatial motion vectors and the plurality of temporal motion vectors. Also, the motion vector selection circuit generates a first-frame similarity measure distribution at a current time, a second-frame movement characteristic at the current time, and another second-frame movement characteristic at a previous time based on the plurality of candidate motion vectors. The movement detection circuit detects movement of an object in continual frames. The movement detection circuit includes a candidate searching module, an object selection module, and a motion vector calculation circuit. The candidate searching module includes a first-frame candidate circuit and a second-frame candidate position. The first-frame candidate circuit locates a first first-frame candidate position and a second first-frame candidate position in the first frame based on the first-frame similarity measure distribution. The second-frame candidate circuit locates a first second-frame candidate position and a second second-frame candidate position in the second frame based on the second-frame movement characteristic. The object selection module is electrically connected to the candidate searching module. The object selection module includes a first-frame object selection circuit and a second-frame object selection circuit. The first-frame object selection circuit is electrically connected to the first-frame candidate circuit. The first-frame object selection circuit identifies which of the first and the second first-frame candidate positions is a first-frame object position representing a position of the object in the first frame according to the first-frame similarity measure distribution and the another second-frame movement characteristic. The second-frame object selection circuit is electrically connected to the second-frame candidate circuit and the first-frame object selection circuit. The second-frame object selection circuit identifies which of the first and the second second-frame candidate positions is a second-frame object position representing a position of the object in the second frame according to the first-frame similarity measure distribution and the second-frame movement characteristic. The motion vector calculation circuit is electrically connected to the object selection module. The motion vector calculation circuit calculates an object motion vector representing a movement of the object between the first frame and the second frame based on the first-frame and the second-frame object positions. The object motion vector is transmitted to the motion vector selection circuit, and the motion vector selection circuit generates a plurality of selected motion vectors based is on the plurality of candidate motion vector and the object motion vector.

According to an alternative embodiment, a movement detection method for detecting movement of an object in continual frames is provided. The movement detection method includes the following steps. Firstly, a first first-frame candidate position and a second first-frame candidate position in a first frame are located based on a first-frame similarity measure distribution at a current time. Besides, a first second-frame candidate position and a second second-frame candidate position in a second frame are located based on a second-frame movement characteristic at the current time. Then, which of the first and the second first-frame candidate positions is a first-frame object position representing a position of the object in the first frame is identified according to the first-frame similarity measure distribution and another second-frame movement characteristic at a previous time. In addition, which of the first and the second second-frame candidate positions is a second-frame object position representing a position of the object in the second frame is identified according to the first-frame similarity measure distribution and the second-frame movement characteristic. Later, an object motion vector representing the movement of the object between the first frame and the second frame is calculated based on the first-frame and the second-frame object positions.

BRIEF DESCRIPTION OF THE DRAWINGS

FIGS. 8A and 8B are schematic diagrams illustrating scenarios when movement of the object OBJ causes isolation positions in similarity measure distribution SAD.

FIG. 19A is a schematic diagram illustrating how the hit map statistic is utilized to determine the second-frame object position PSobjf2 when the smoothness constraint of the spatial motion vector MVsp is weak.

FIG. 19B is a schematic diagram illustrating how the hit map statistic is utilized to determine the second-frame object position PSobjf2 when the smoothness constraint of the spatial motion vector MVsp is strict.

Figure 1A:
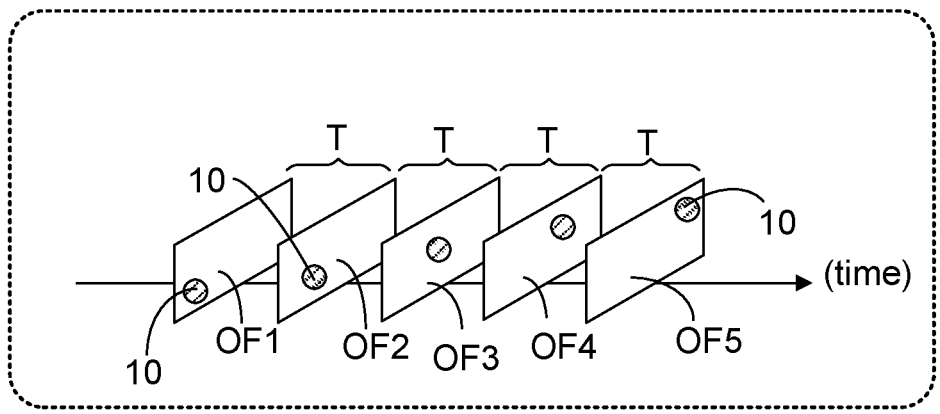
FIGS. 1A and 1B (prior art) schematically show a process for frame rate conversion.
Figure 1B:
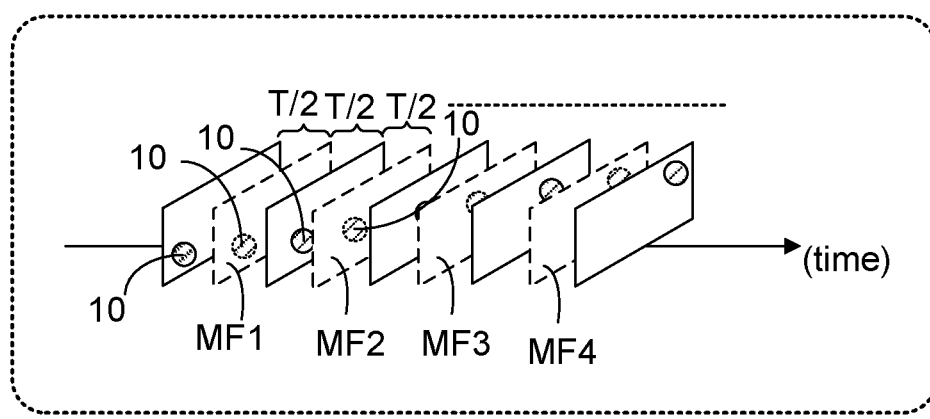

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
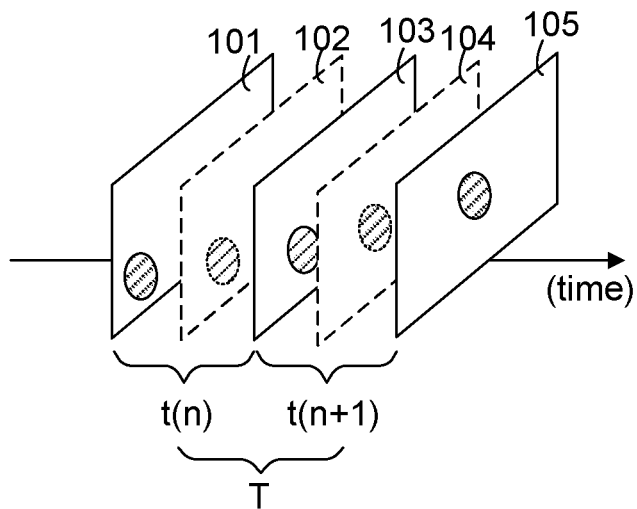
FIG. 2 is a schematic diagram illustrating the relationship between frames and time.

FIG. 2 is a schematic diagram illustrating the relationship between frames and time. In FIG. 2, the source frames 101, 103, 105 are shown with solid lines, and the interpolated frames 102, 104 are shown with dotted lines. When any of the interpolated frames 102, 104 is generated, two of the source frames 101, 103, 105 are required. The two source frames 101, 103, 105 being used for generating the interpolated frames 102, 104 (M-frame or phase frame) are respectively defined as a reference source frame and a current source frame.

At a current time t(n), the source frames 101, 103 are used to generate the interpolated frame 102. The source frame 101 is defined as the reference source frame (for example, I-frame) at the current time t(n), and the source frame 103 is defined as the current source frame (for example, P-frame) at the current time t(n). In the specification; the reference source frame is considered as a first frame f1, and the current source frame is considered as a second frame f2.

At a next time t(n+1) after the current time t(n), the source frames 103, 105 are used to generate the interpolated frame 104. The source frame 103 is the reference source frame (I-frame) at the next time t(n+1), and the source frame 105 is the current source frame (P-frame) at the next time t(n+1).

As illustrated above, the source frame 103 is utilized as P-frame at the current time t(n) and as I-frame at the next time t(n+1). Therefore, P-frame at the current time t(n) is further utilized as I-frame at the next time t(n+1). Similarly, the source frame 101 is actually utilized as P-frame at a previous time t(n−1) and I-frame at the current time t(n). The previous time t(n−1) is prior to the current time t(n). The time difference between the previous time t(n−1) and the current time t(n) and the time difference between the current time t(n) and the next time t(n+1) are equivalent to the capturing interval T. The following illustrations are related to operations at the current time t(n) if the operation time is not specifically mentioned.

Figure 3:
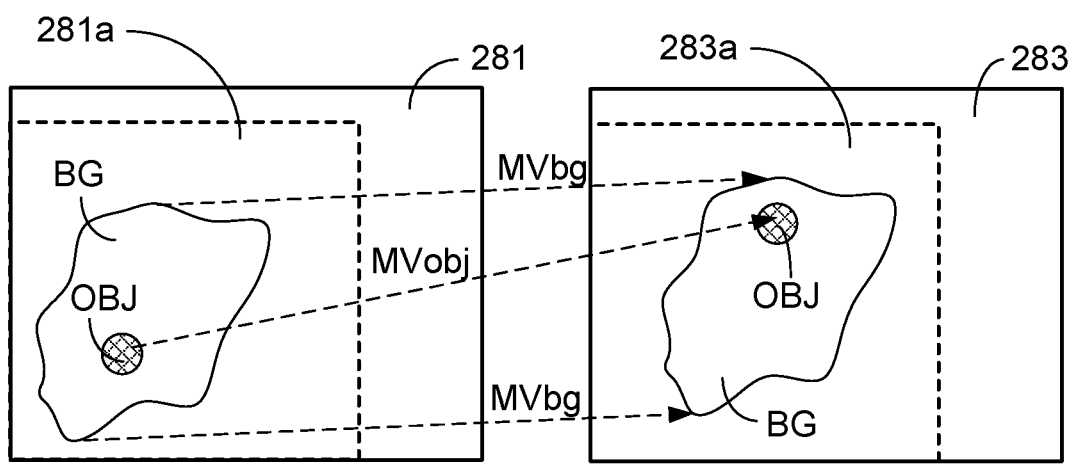
FIG. 3 is a schematic diagram illustrating occasion when movement of the object is inconsistent with the movement of background.

FIG. 3 is a schematic diagram illustrating occasion when the object motion vector MVobj is inconsistent with the background motion vector MVbg. In FIG. 3, a first frame 281 and a second frame 283 are shown, and dotted rectangles represent a first-frame searching region 281a in the first frame 281, and a second-frame searching region 283a in the second frame 283, respectively. Size of the first-frame searching region 281a is smaller than or equivalent to the size of the first frame 281.

Size of the first-frame searching region 281a and size of the second-frame searching region 283a are equivalent. Location of the first-frame searching region 281a in the first frame #1 is assumed to be the same as the location of the second-frame searching region 283a in the second frame f2. The physical location of the first-frame searching region 281a in the first frame 281 may vary, so as the physical location of the second-frame searching region 283a in the second frame 283.

In both the first-frame searching region 281a and the second-frame searching region 283a, an object OBJ (for example, a ball) and a background area BG (for example, a grass field) are shown. Dotted arrows are used to represent motion vectors (MV), including a background motion vector MVbg and the object motion vector MVobj. The background motion vector MVbg represents the movement of the background area BG between the first frame 281 and the second frame 283. The object motion vector MVobj represents the movement of the object OBJ between the first frame 281 and the second frame 283. As illustrated above, the background motion vector MVbg and the object motion vector MVobj can be inconsistent.

Figure 4:
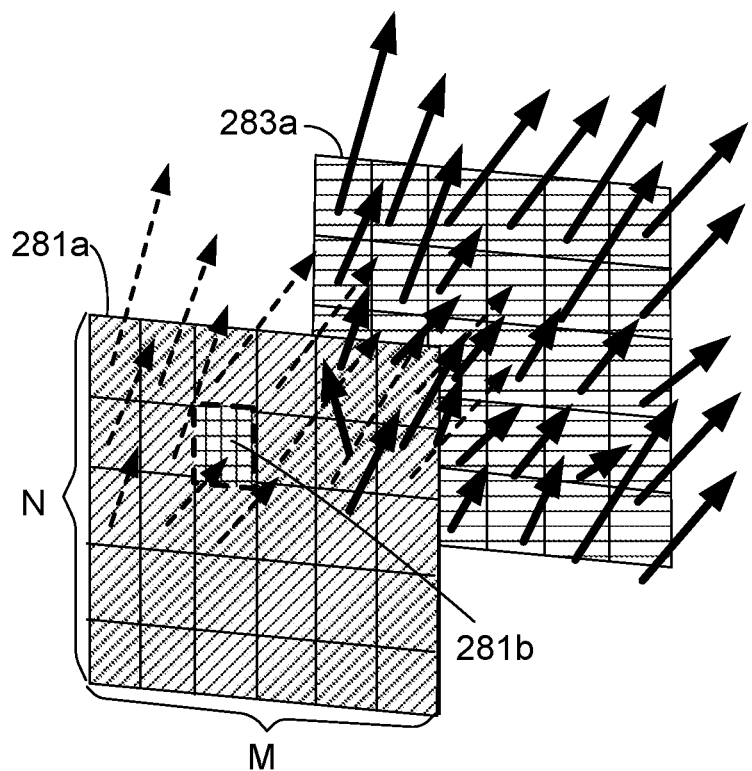
FIG. 4 is a schematic diagram illustrating blocks in the searching region and sources of candidate motion vectors.

FIG. 4 is a schematic diagram illustrating blocks in the searching region and sources of candidate motion vectors. According to an embodiment of the present disclosure; the first-frame searching region 281a, and the second-frame searching region 283a are divided into units of blocks. As shown in FIG. 4, each of the first-frame searching region 281a and the second-frame searching region 283a includes M*N blocks, and a selected block 281b in the first-frame searching region 281a is taken as an example for searching its best motion vector MVbst. Size of the first-frame searching region 281a is equivalent to the size of the second-frame searching region 283a.

Generally, movements of the image are continuous and coherent; this implies that temporal motion vectors MVtemp, representing temporal (inter-frame) relevance among motion vectors of blocks, can be referred to reduce calculation. In FIG. 4, the dotted arrows show temporal motion vectors MVtemp representing movement characteristic of the image contents (pixel data) shown in the blocks in I-frame (the first frame 281) and P-frame (the second frame 283).

Usually, movements of adjacent blocks are similar, and spatial motion vectors MVsp, representing spatial relevance (intra-frame) relevance among motion vectors of blocks, can be referred to reduce calculation. The solid arrows show the spatial motion vectors MVsp representing movement characteristic of the image contents (pixel data) shown in the blocks in P-frame (the second frame 283).

Although the above mentioned temporal motion vectors MVtemp and spatial motion vectors MVsp can be referred to reduce calculations in many situations, applications of the temporal motion vectors MVtemp and the spatial motion vectors MVsp have their limitations. For example, the area of a small object is relatively small so that the spatial motion vectors MVsp of the blocks close to the small object are not suitable for estimating the object motion vector MVobj of the small object. Moreover, the small object may move very fast so that the temporal motion vectors MVtemp calculated at the first frame 281 do not help estimating the object motion vector MVobj of the small object in the second frame 283 at all.

To find the best motion vector MVbst of the selected block 281b, a motion estimation circuit utilizes block matching algorithms (BMAs) to evaluate similarities between blocks in different frames. During the evaluation, the motion estimation circuit determines whether the selected block 281b and the blocks in the second-frame searching region 283a have the same image content based on the similarity measure, for example, the summation of absolute difference (SAD). In short, SAD represents the sum of all absolute differences of pixel values between a block in the first frame 281 and another block having the same image content in the second frame 283.

Ideally, if the image contents of the blocks in the first frame 281 and the second frame 283 coincide with each other, the SAD value approaches to "0". However, exhaustive search of the blocks in the first frame 281 and the second frame 283 to find the lowest SAD value is time-consuming. Thus, in practical application, some motion vectors are selected and defined as candidate motion vectors MVcan, and the motion estimation circuit 23 evaluates only SAD values corresponding to the candidate motion vectors MVcan.

According to an embodiment of the present disclosure, the source of the candidate motion vectors MVcan includes the temporal motion vectors MVtemp, the spatial motion vectors MVsp, some random motion vectors MVran, some updated motion vectors MVup, and the object motion vector MVobj. By generating the object motion vector MVobj and adding the object motion vector MVobj to the pool of the candidate motion vectors MVobj, the motion estimation circuit can select the object motion vector MVobj as the best motion vector MVbst of the selected block 281b. Accordingly, a motion compensation circuit 25 can correctly determine which of the blocks in the interpolated frames should be used to display the image content of the selected block 281b.

To evaluate which of the candidate motion vectors MVcan should be used by the motion compensation circuit 25, between first frame 281 and second frame 283, SAD values and other criterion are evaluated on each candidate, and the best motion vector MVbst corresponding to the image content of the selected block 281b can be obtained.

Figure 5:
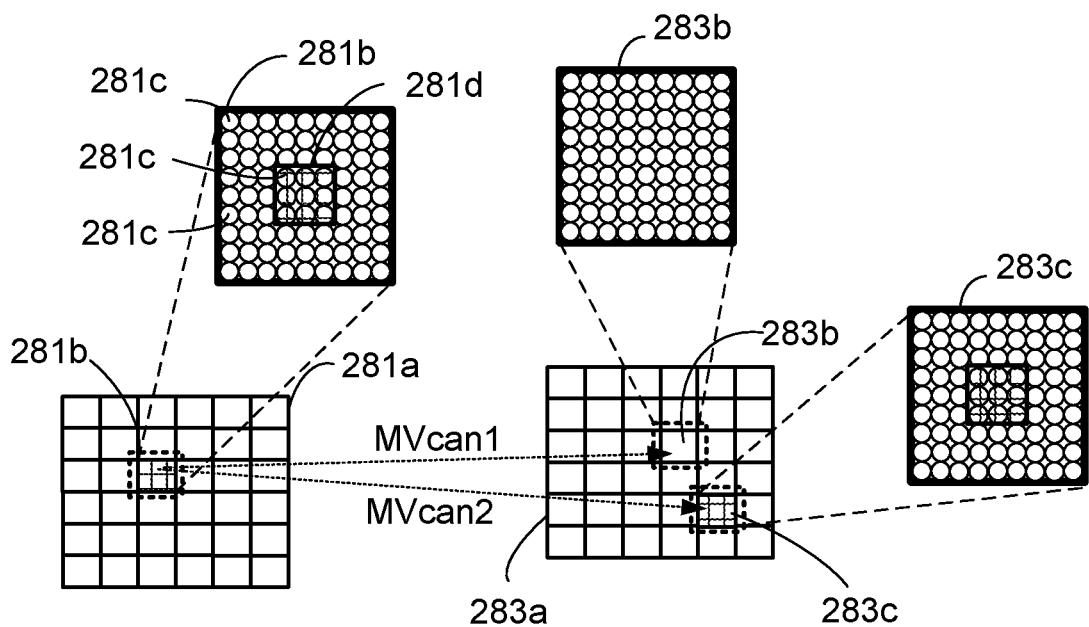
FIG. 5 is a schematic diagram illustrating the selection of motion vector based on the sum of absolute differences of pixels in blocks.

FIG. 5 is a schematic diagram illustrating the selection of motion vector based on the SAD values of pixels in blocks. In FIG. 5, two candidate motion vectors MVcan1, MVcan2 are shown as examples for briefly illustrating the block matching algorithm.

The candidate motion vector MVcan1 is corresponding to a possible movement of the selected block 281b, and the candidate motion vector MVcan1 indicates that the image content of the selected block 281b moves from the selected block 281b located at third column and the third row in the first-frame searching region 281a to a target block 283b located at the fourth column and the third row in the second-frame searching region 283a. The candidate motion vector MVcan2 is corresponding to another possible movement of the selected block 281b, and the candidate motion vector MVcan2 indicates that the image content of the selected block 281b moves from the selected block 281b located at third column and the third row in the first-frame searching region 281a to another target block 283c located at the fifth column and the fifth row in the second-frame searching region 283a.

Two SAD values are calculated by comparing the pixel data 281c in the selected block 281b in the first-frame searching region 281a with pixel data in the target blocks 283b, 283c in the second-frame searching region 283a, The SAD value being calculated based on the selected block 281b in the first-frame searching region 281a and the target block 283c in the second-frame searching region 283a is lower than the SAD value being calculated based on the selected block 281b in the first-frame searching region 281a and the target block 283b in the second-frame searching region 283a. Thus, the candidate motion vector MVcan2 is selected to represent the movement of the pixel data 281c in the selected block 281b.

In the following, operations about the motion estimation circuit are illustrated. According to the present disclosure, two of I-frame, P-frame, and M-frame are selected for recognizing the object positions in I-frame and P-frame. One of the two selected frames is defined as the first-frame f1, and the other of the two frames being selected is defined as the second-frame f2. In the specification, I-frame is assumed to be an example of the first frame f1, and P-frame is assumed to be an example of the second frame f2. However, in practical application, which of the frames is selected as the first frame f1 and the second frame f2 should not be limited.

Figure 6:
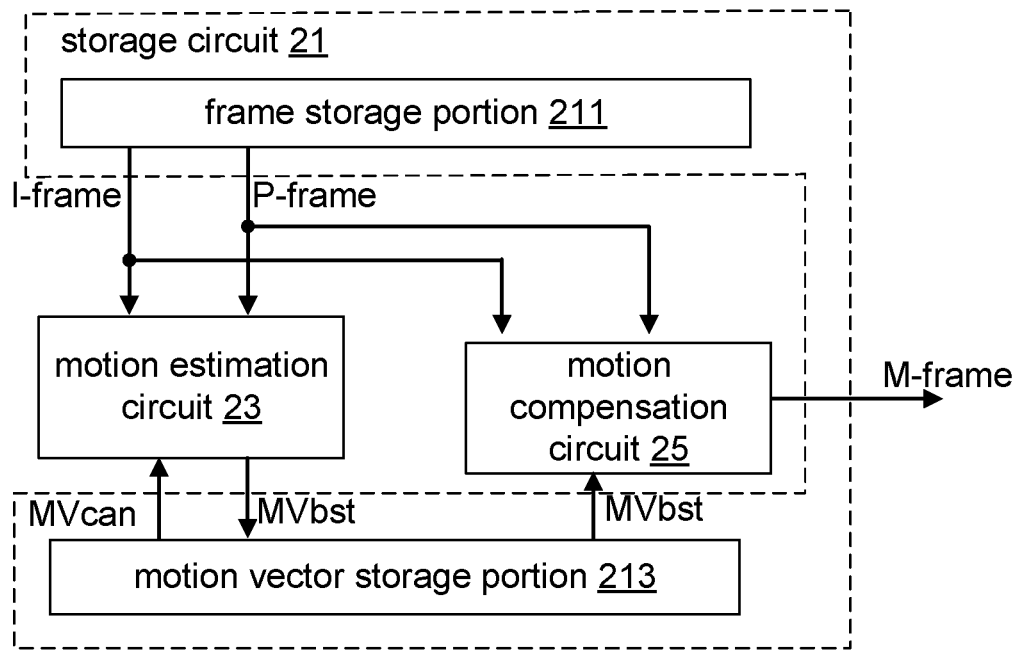
FIG. 6 shows a block diagram illustrating a video decoder having a frame rate conversion function.

FIG. 6 shows a block diagram illustrating that a video decoder has a frame rate conversion function. The video decoder 20 includes a motion estimation circuit 23, a motion compensation circuit 25 and a storage circuit 21. Both the motion estimation circuit 23 and the motion compensation circuit 25 are electrically connected to the storage circuit 21.

The storage circuit 21 can be, for example, double data rate (DDR) or synchronous dynamic random access memory (SDRAM). Implementations and types of the storage circuit 21 are not limited. The storage circuit 21 can be classified into two portions, that is, a frame storage portion 211 and a motion vector storage portion 213. The frame storage portion 211 is configured to save frame data and the motion vector storage portion 213 is configured to save motion vectors.

The motion estimation circuit 23 receives I-frame and P-frame from the frame storage portion 211 to generate some candidate motion vectors MVcan. In addition, the motion estimation circuit 23 may receive some candidate motion vectors MVcan from the motion vector storage portion 213. Then, the motion estimation circuit 23 selects some best motion vectors MVbst from the candidate motion vectors MVcan. The best motion vectors MVbst are further transmitted to and stored at the motion vector storage portion 213.

After receiving I-frame and P-frame from the frame storage portion 211 and receiving the best motion vectors MVbst from the motion vector storage portion 213, the motion compensation circuit 25 can accordingly generate M-frame. Implementations and operation of the motion compensation circuit 25 may be varied in practical design.

Figure 7:
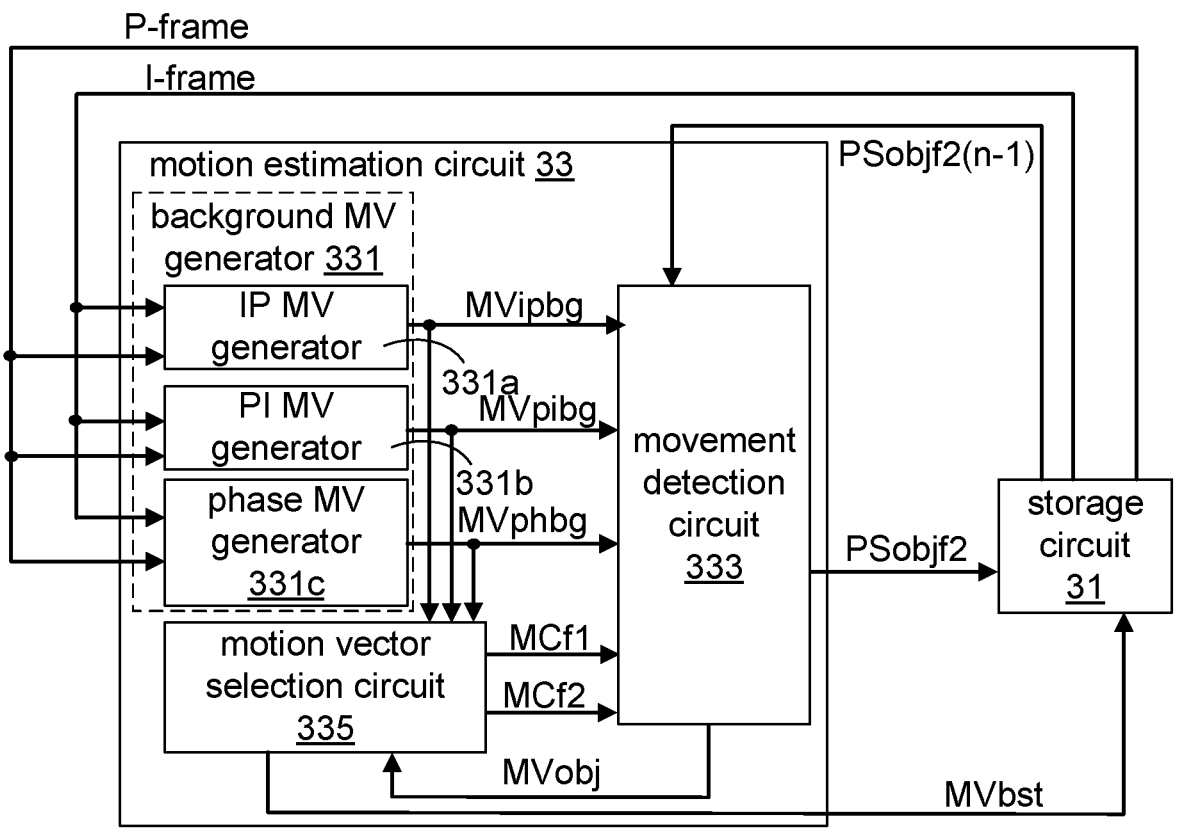
FIG. 7 shows a block diagram illustrating a motion estimation circuit capable of detecting the object motion vector MVobj being different from background motion vector MVbg.

FIG. 7 shows a block diagram illustrating a motion estimation circuit capable of detecting the object motion vector MVobj being different from the background motion vector MVbg. The motion estimation circuit 33 includes a background motion vector generator 331, a motion vector selection circuit 335 and a movement detection circuit 333.

The background motion vector generator 331 is electrically connected to the storage circuit 31, the movement detection circuit 333 and the motion vector selection circuit 335. The motion vector selection circuit 335 is electrically connected to the movement detection circuit 333 and the storage circuit 31. The movement detection circuit 333 is electrically connected to the storage circuit 31.

The background motion vector generator 331 further includes an IP MV generator 331a, a PI MV generator 331b, and a phase MV generator 331c. The IP MV generator 331a generates some background forward motion vectors MVipbg, for representing motion vectors of the background area BG being originated from I-frame and projected to P-frame. Therefore, the IP MV generator 331a can be defined as a forward motion vector generator. The PI MV generator 331b generates some background backward motion vectors MVpibg, for representing motion vectors of the background area BG being originated from P-frame and projected to I-frame. Therefore, the PI MV generator 331b can be defined as a backward motion vector generator. The background forward motion vectors MVipbg and the background backward motion vectors MVpibg can be classified as the monodirectional motion vectors.

The phase MV generator 331c generates background phase motion vectors MVphbg, for representing motion vectors of the background area BG being originated from M-frame and projected to I-frame and/or P-frame. Therefore, the phase MV generator 331c can be defined as a bidirectional motion vector generator. The background phase motion vectors MVphbg can be classified as the bidirectional motion vectors.

As the background forward motion vectors MVipbg, the background backward motion vectors MVpibg, and the background phase motion vectors MVphbg represent the movement of the background area BG in time adjacent frames, these motion vectors can be considered as temporal motion vectors MVtemp. Detail illustrations about the generation of the background forward motion vectors MVipbg, the background backward motion vectors MVpibg and the background phase motion vector MVphbg are omitted.

The background forward motion vectors MVipbg, the background backward motion vectors MVpibg, and the background phase motion vectors MVphbg are further transmitted to the movement detection circuit 333 and the motion vector selection circuit 335.

To evaluate whether a moving object OW exists in the background area BG based on the motion vectors, the motion vector selection circuit 335 generates movement characteristics corresponding to the first frame and the second frame, that is, the first-frame movement characteristic corresponding to the first-frame (MCf1) and the second-frame movement characteristic corresponding to the second-frame (MCf2). Later, the first-frame movement characteristic corresponding to the first-frame (MCf1) and the second-frame movement characteristic corresponding to the second-frame (MCf2) are transmitted to the movement detection circuit 333.

The first-frame movement characteristic MCf1 can be, for example, a first-frame similarity measure distribution SADf1 (for example, distribution of sum of absolute difference corresponding to I-frame SADi and calculated based on the background forward motion vectors MVipbg). The second-frame movement characteristic MCf2 can be, for example, a second-frame similarity measure distribution SADf2 (for example, distribution of sum of absolute difference corresponding to P-frame SADp and calculated based on the background backward motion vectors MVpibg) or motion vector mapping.

The similarity measure distribution SAD includes plural similarity measure results (SAD values) corresponding to the blocks in each frame. Detail illustrations about the generation of the first-frame similarity measure distribution SADf1, the second-frame similarity measure distribution SADf2, and the motion vector mapping are omitted for simplicity.

Based on the second-frame object position at the previous time t(n−1) (that is, PSobj(n−1)), the first frame movement characteristic MCf1 and the second-frame movement characteristic (MCf2), the movement detection circuit 333 is capable of detecting whether the object OBJ exists in the background BG, locations of the object OBJ in I-frame and P-frame, and generating the object motion vector MVobj if the object OBJ is confirmed to exist in the background area BG.

If the object OBJ exists in the background area BG, the movement detection circuit 333 transmits the object motion vector MVobj to the motion vector selection circuit 335, and a second-frame object position PSobjf2 to the storage circuit 31. More details about operations of the movement detection circuit 33 are illustrated below.

According to the embodiment of the present disclosure, the second-frame object position represents the position of the object OBJ in the second frame. The second-frame object position at the previous time PSobjf2(n−1) can be referred by the movement detection circuit 333 at the current time t(n) to determine the position of the object in the first frame at the current time PSobjf1(n), Thus, the second-frame object position at the previous time PSobjf2(n−1) is stored at the storage circuit 31. Similarly, the second-frame object position at the current time PSobjf2(n) is stored at the storage circuit 31 and will be referred as the first-frame object position at the next time PSobjf1(n+1).

The motion vector selection circuit 335 generates the best motion vectors MVbst respectively corresponding to each block (including the blocks showing the object OBJ and the background area BG) in I-frame and P-frame to the storage circuit 31. The best motion vectors MVbst are stored at the storage circuit 31 so that the motion compensation circuit can utilize them later.

FIGS. 8A and 8B are schematic diagrams illustrating scenarios when the object motion vector MVobj causes isolation positions in similarity measure distribution SAD. As shown in FIGS. 8A and 8B, the arrows represent background motion vectors MVbg including the background forward motion vectors MVipbg and the background backward motion vectors MVpibg.

FIG. 8A is corresponding to the case that the object OBJ is targets (sink) of background motion vectors MVbg. FIG. 8B is corresponding to the case that the object OBJ is sources (origins) of the background motion vectors MVbg.

The first-frame object position PSobjf1 represents the actual position of the object OBJ in the first-frame f1, and the first-frame camouflage position PSghf1 represents the position in the first-frame f1 which might be mistakenly recognized as the first-frame object position PSobjf1. Similarly, the second-frame object position PSobjf2 represents the actual position of the object in the second frame, and the second-frame camouflage position PSghf2 represents the position in the second-frame f2 which might be mistakenly recognized as the second-frame object position PSobjf2.

According to FIG. 8A, the first-frame camouflage position PSghf1 is the position in the first frame f1 being the source position of the background forward motion vectors MVipbg that is projected to the second-frame object position PSobjf2. That is, when the second-frame object position PSobjf2 functions as the sink of the background forward motion vectors MVipbg, the source of the background forward motion vectors MVipbg being projected to the second-frame object position PSobjf2 is the first-frame camouflage position PSghf1. As shown in FIG. 8A, the first-frame camouflage position PSghf1 is corresponding to an isolation position (bulge or local maximum) in the similarity measure distribution corresponding to I-frame SADi.

Moreover, the second-frame camouflage position PSghf2 is the position in the second frame f2 being the source position of the background backward motion vector MVpibg that is projected to the first-frame object position PSobjf1. That is, when the first-frame object position PSobjf1 functions as the sink of the background backward motion vectors MVpibg, the source of the background backward motion vectors MVpibg being projected to the first-frame object position PSobjf1 is the second-frame camouflage position PSghf2. As shown in FIG. 8A, the second-frame camouflage position PSghf2 is corresponding to an isolation position in the similarity measure distribution corresponding to P-frame SADp.

According to FIG. 8B, the first-frame object position PSobjf1, being the source position of the background forward motion vectors MVipbg, is corresponding to an isolation position of the similarity measure distribution corresponding to I-frame SADi; and the second-frame object position PSobjf2, being the source position of the background backward motion vector MVpibg, is corresponding to an isolation position of the similarity measure distribution corresponding to P-frame SADp.

Figure 9:
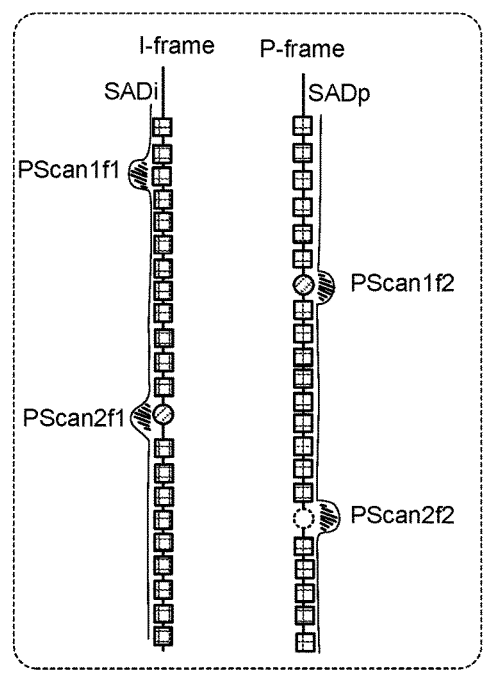
FIG. 9 is a schematic diagram illustrating a combination of similarity measure distributions SAD shown in FIGS. 8A and 8B.

FIG. 9 is a schematic diagram stating a combination of similarity measure distributions SADi, SADp shown in FIGS. 8A and 8B. In FIG. 9, the similarity measure distribution corresponding to I-frame SADi and the similarity measure distribution corresponding to P-frame SADp shown in FIGS. 8A and 8B are combined together.

As illustrated above, the isolation positions in the similarity measure distribution corresponding to I-frame SADi are related to the first-frame camouflage position PSghf1 (FIG. 8A) and the first-frame object position PSobjf1 (FIG. 8B), respectively. In FIG. 9, the isolation positions corresponding to I-frame are defined as the first-frame candidate positions PScanf1, including a first first-frame candidate position PScan1/1 and a second first-frame candidate position PScan2/1. In practice, which of the first first-frame candidate positions PScan1/1 and the second first-frame candidate position PScan2/1 is actually corresponding to the first-frame object position PSobjf1 is unknown in advance.

Similarly, the isolation positions in the similarity measure distribution corresponding to P-frame SADp are related to the second-frame camouflage position PSghf2 (FIG. 8A) and the second-frame object position PSobjf2 (FIG. 8B), respectively. In FIG. 9, the isolation positions corresponding to P-frame are defined as the second-frame candidate positions PScanf2, including a first second-frame candidate position PScan1/2 and a second second-frame candidate position PScan2/2. In practice, which of the first second-frame candidate positions PScan1/2 and the second second-frame candidate position PScan2/2 is actually corresponding to the second-frame object position PSobjf2 is unknown in advance.

According to the embodiment of the present disclosure, the movement detection circuit 333 firstly identifies the candidate positions based on searching isolation positions in the similarity measure distribution corresponding to I-frame SADi and the similarity measure distribution corresponding to P-frame SADp. In practical application, which of the first/second first-frame candidate positions PScan1/1, PScan2/2 is the first-frame object position PSobjf1 and the first-frame camouflage position PSghf1 may vary and which of the first/second second-frame candidate positions PScan1/2, PScan2/2 is the second-frame object position PSobjf2 and the second-frame camouflage position PSghf2 may vary. Once the first/second candidate positions in the first frame and the second frame are found, which of the first/second candidate positions is actually corresponding to the object OBJ needs to be identified.

Figure 10:
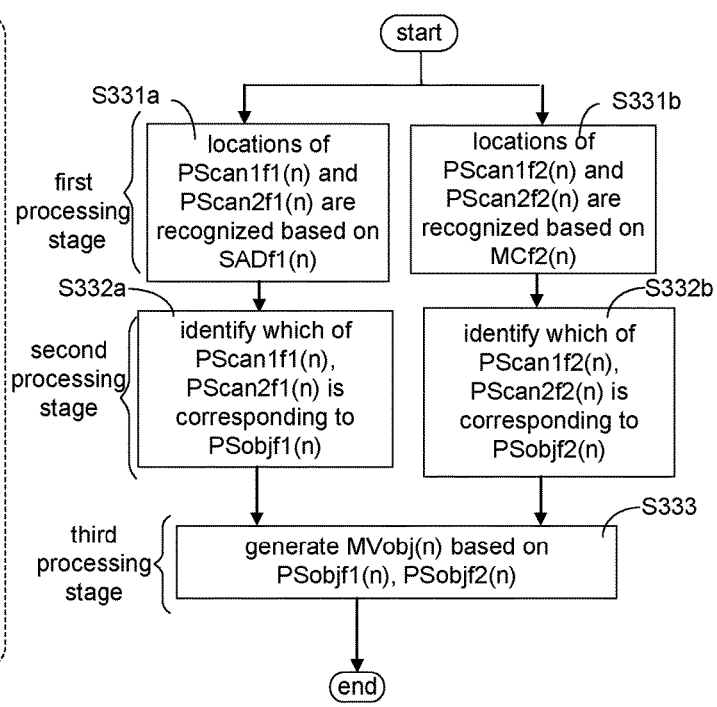
FIG. 10 is a flow diagram illustrating operation of the movement detection circuit.

FIG. 10 is a flow diagram illustrating operation of the movement detection circuit. Although this flow shows the operations being performed at the current time t(n), the flow is repetitively performed at different time t(n−1), t(n), t(n+1), etc. The first frame f1 and the second frame f2 can be respectively referred as the I-frame and the P-frame as mentioned in the example above.

In the first processing stage, the isolation positions in the similarity measure distributions SAD corresponding to the first frame f1 and the second frame f2 need to be identified. For the first frame f1, locations of the first-frame candidate positions at the current time (PScan1/1($n$), PScan2/1($n$)) are recognized based on the similarity measure distribution corresponding to the first frame at the current time SADf1($n$) (step S331$a$). For the second frame f2, locations of the second-frame candidate positions at the current time (PScan1/2($n$), PScan2/2($n$)) are recognized based on the second-frame movement characteristic at the current time MCf2($n$) (step S331$b$).

In the second processing stage, which of the isolation positions represent the object positions need to be identified. In step S332$a$, the movement detection circuit 333 identifies which of the first-frame candidate positions at the current time (PScan1/1($n$), PScan2/1($n$)) is actually corresponding to the first-frame object position at the current time PSobjf1($n$) based on the similarity measure distribution corresponding to the first frame at the current time SADf1($n$) and the second-frame movement characteristic at the previous time MCf2($n$−1). In step S332$b$, the movement detection circuit 333 identifies which of the second-frame candidate positions (PScan1/2, PScan2/2) is corresponding to the second-frame object position at the current time PSobjf2($n$) based on the similarity measure distribution corresponding to the first frame at the current time SADf1($n$) and the second-frame movement characteristic at the current time MCf2($n$).

By the end of the second processing stage, the first-frame object position PSobjf1 and the second-frame object position PSob f2 have been determined. Then, in the third processing stage, the movement detection circuit 333 calculates the object motion vector MVobj at the current time MVobj(n) based on the first-frame object position PSobjf1($n$) and the second-frame object position PSobjf2($n$) (step S333).

Figure 11:
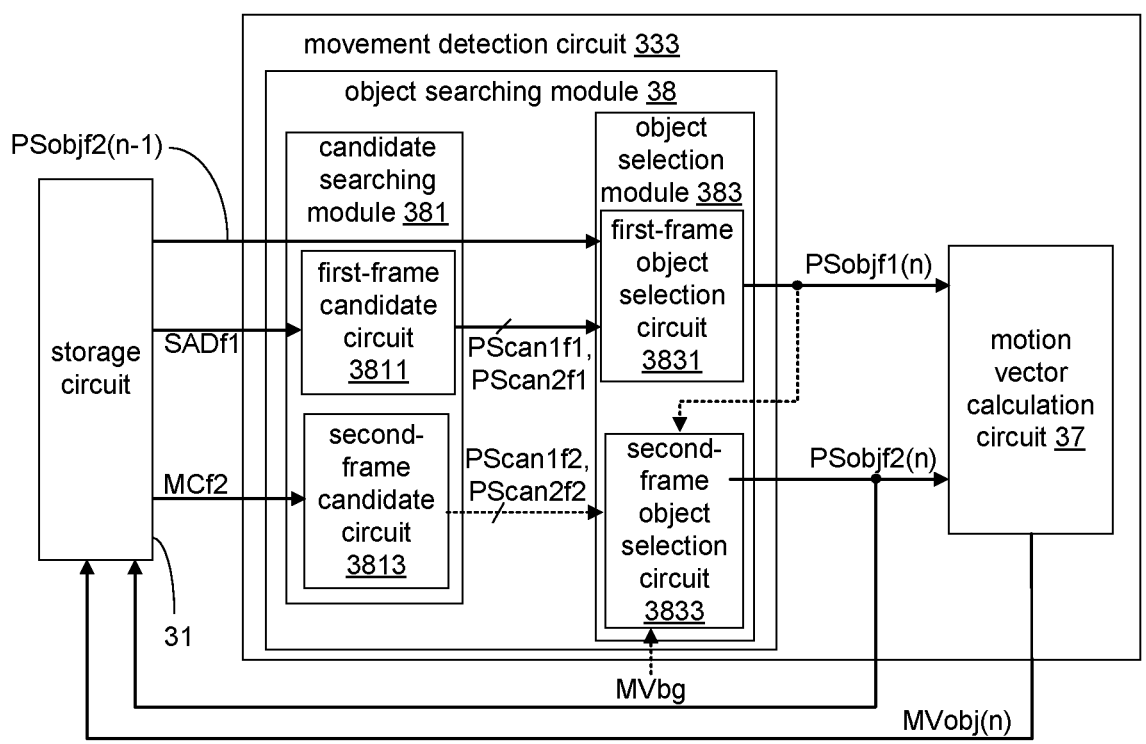
FIG. 11 is a block diagram illustrating the movement detection circuit.

FIG. 11 is a block diagram illustrating the movement detection circuit. The movement detection circuit 333 includes an object searching module 38 and a motion vector calculation circuit 37. The object searching module 38 further includes a candidate searching module 381 and an object selection module 383. The candidate searching module 381 and the motion vector calculation circuit 37 are electrically connected to the storage circuit 31. The object selection module 383 is electrically connected to the background MV generator 331, the candidate searching module 381 and the motion vector calculation circuit 37. The motion vector calculation circuit 37 is electrically connected to the motion vector selection circuit 335.

The three processing stages of the movement detection circuit 333 are respectively performed by the candidate searching module 381, the object selection module 383, and the motion vector calculation circuit 37.

The candidate searching module 381 further includes a first-frame candidate circuit 3811 and a second-frame candidate circuit 3813, for respectively searching candidate positions in the first frame f1 and the second frame f2. In the first processing stage, the first-frame candidate circuit 3811 recognizes locations of a first first-frame candidate position PScan1/1 and a second first-frame candidate position PScan2/2 based on where the isolation positions are found in the first-frame similarity measure distribution SADf1, and the second-frame candidate circuit 3813 recognizes locations of the first second-frame candidate position PScan1/2 and the second second-frame candidate position PScan2/2 based on the second-frame movement characteristic MCf2.

The object selection module 383 further includes a first-frame object selection circuit 3831 and a second-frame object selection circuit 3833, for respectively identifying the object positions in the first frame f1 and the second frame f2. The first-frame object selection circuit 3831 is electrically connected to the first-frame candidate circuit 3811 and the motion vector calculation circuit 37. The second-frame object selection circuit 3833 is electrically connected to the second-frame candidate circuit 3813, the first-frame object selection circuit 3831, and the motion vector calculation circuit 37.

In the second processing stage, the first-frame object selection circuit 3831 identifies which of the first/second candidate positions PScan1/1,PScan2/1 in the first frame f1 is actually corresponding to the first-frame object position PSobjf1, and the second-frame object selection circuit 3833 identifies which of the first/second candidate positions PScan1/2, PScan2/2 in the second frame f2 is actually corresponding to the second-frame object position PSobjf2.

In the third processing stage, the motion vector calculation circuit 37 calculates the object motion vector MVobj representing the movement of the object between the first frame f1 and the second frame f2 based on the first-frame object position PSobjf1 and the second-frame object position PSobjf2.

Figures 20, 21:
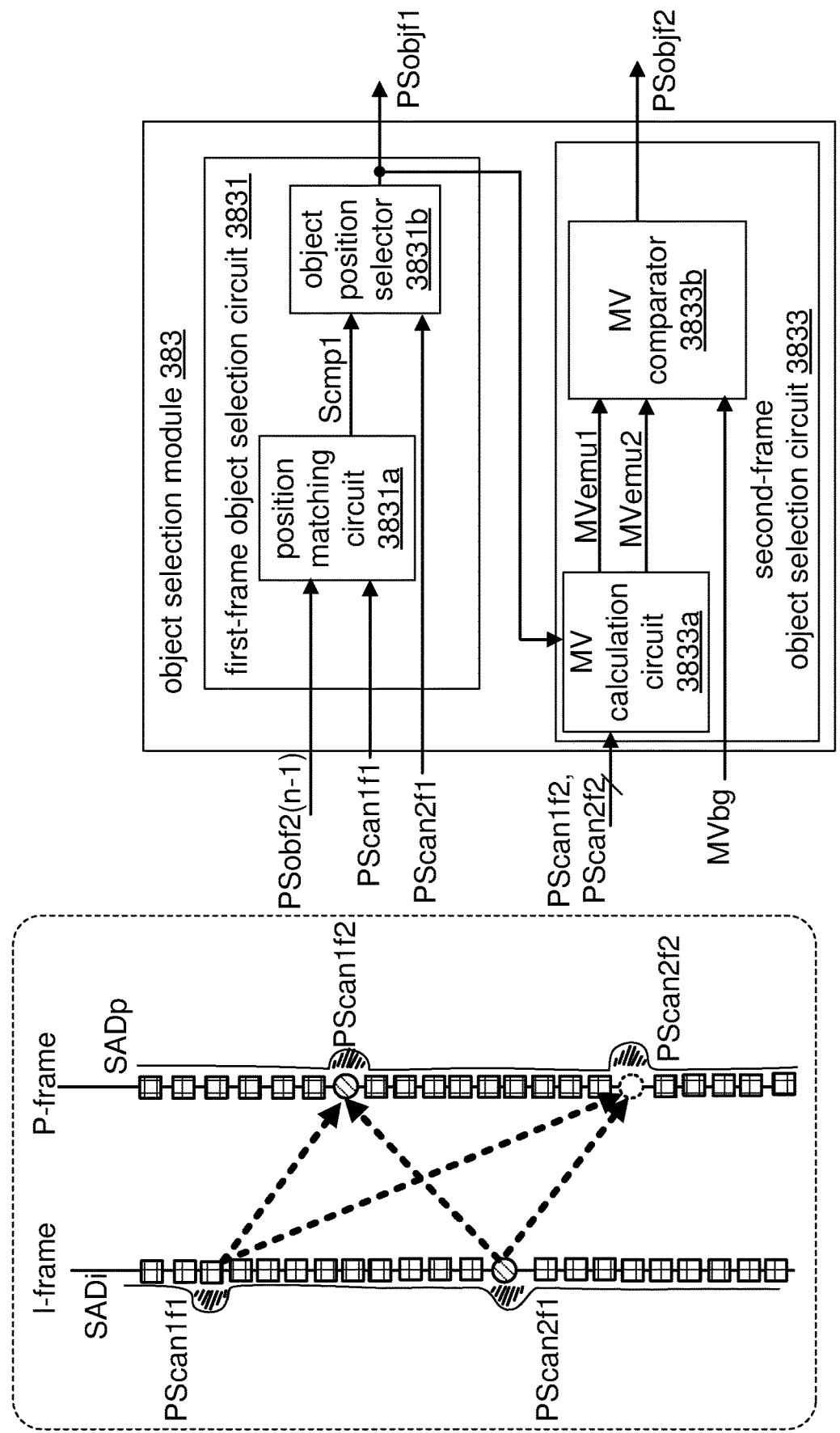
FIG. 20 is a schematic block diagram illustrating four different motion vectors can be obtained according to the first-frame candidate positions and the second-frame candidate positions.
FIG. 21 is a schematic block diagram illustrating the object selection module.
Figure 23:
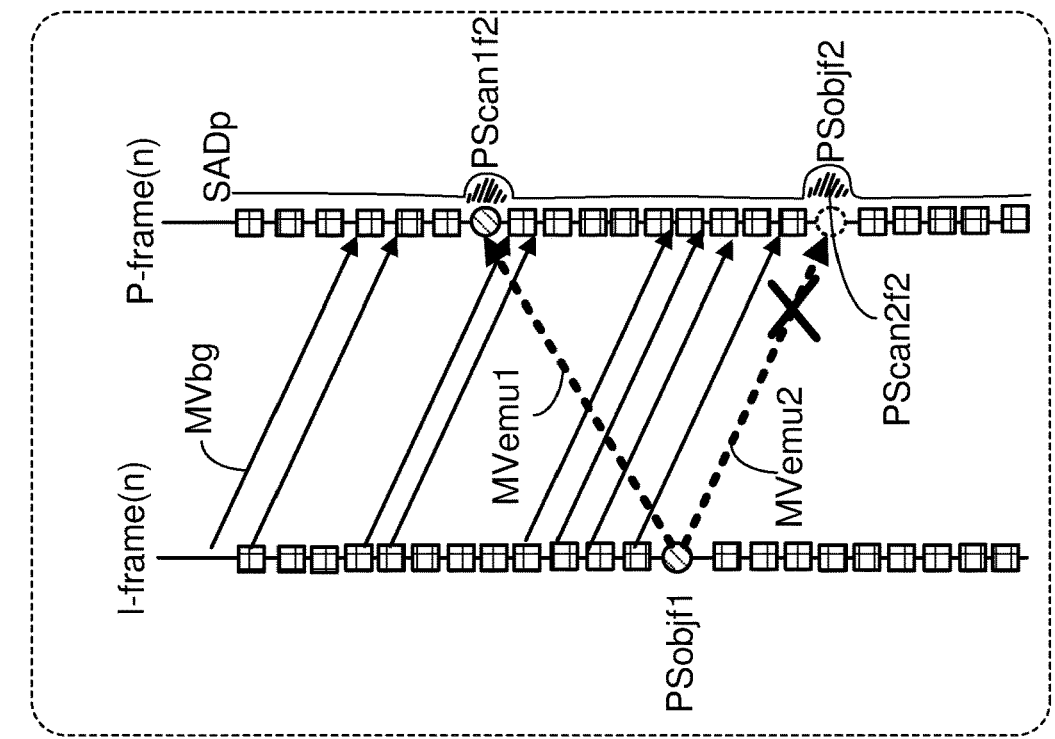
FIG. 23 is a schematic diagram illustrating how the second-frame object position PSobjf2 is selected from the second-frame candidate positions PScan1f2, PScan2f2.
Figure 22:
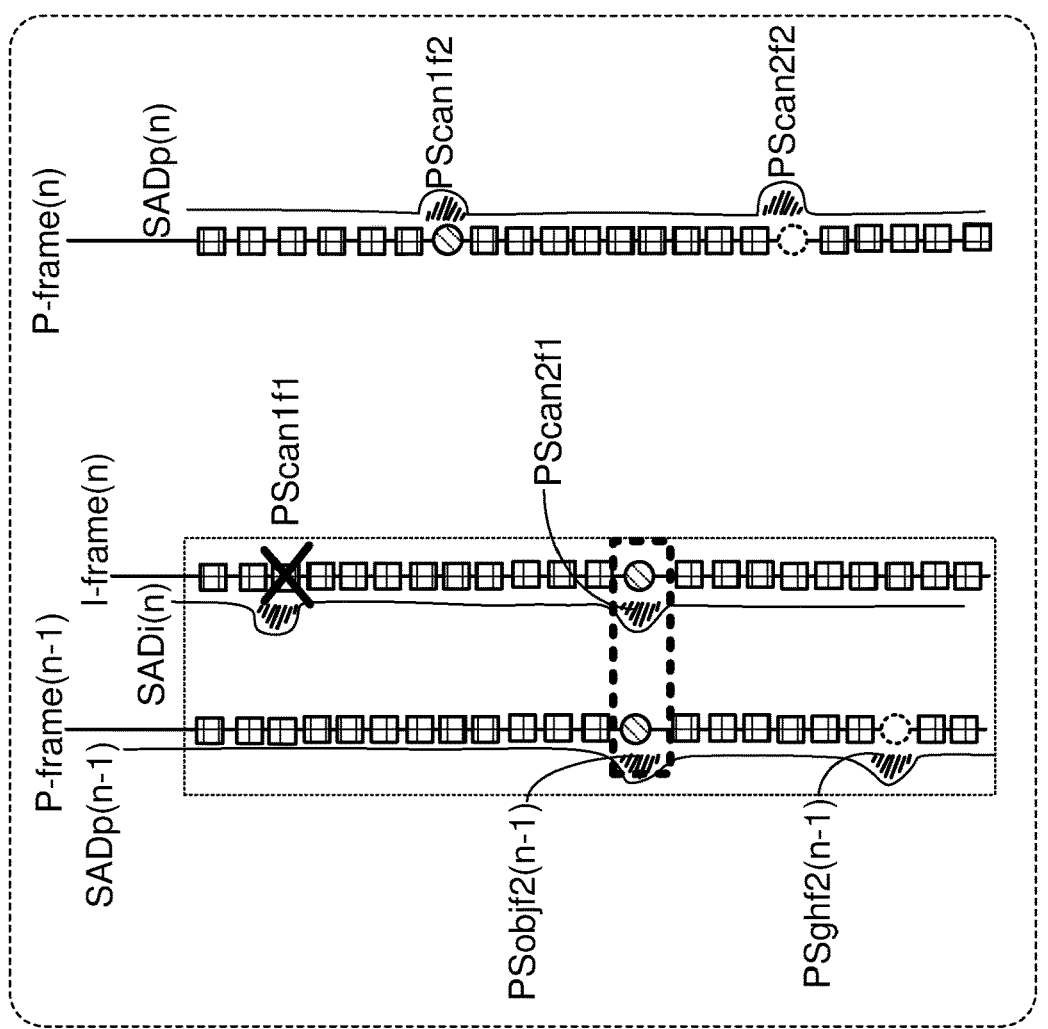
FIG. 22 is a schematic diagram illustrating how the first-frame object position PSobjf1 is selected from the first-frame candidate positions PScanf1.
Figure 24:
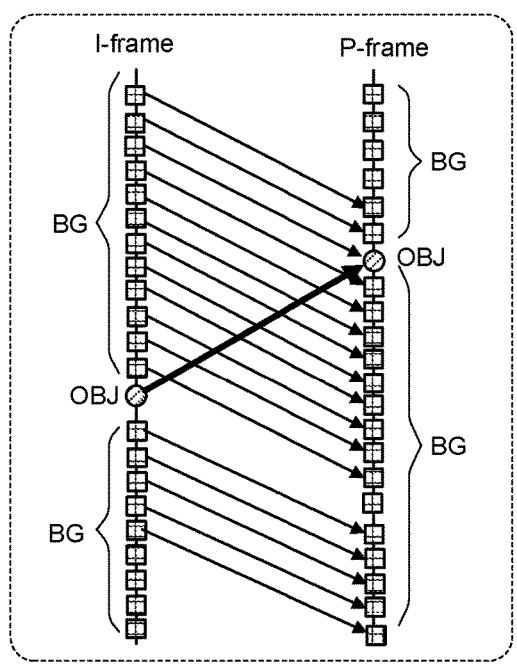
FIG. 24 is a schematic diagram illustrating the calculation of the object motion vector.

The three processing stages are respectively illustrated below. FIGS. 12A, 12B, 13, 14, 15, 16, 17, 18, 19A, 19B are related to the first processing stage. FIGS. 21, 22, 23 are related to the second processing stage. FIG. 24 is related to the third processing stage.

As illustrated above, the isolation positions exist in both the first frame f1 and the second frame f2, and both the object positions and the camouflage positions may cause isolation positions in similarity measure distributions SAD. As recognition of the isolation positions in the similarity measure distributions corresponding to the first frame f1 and the second-frame f2 are similar, the following illustrations about recognizing the isolation positions do not specify causes and/or frames corresponding to the isolation positions.

Figure 12A:
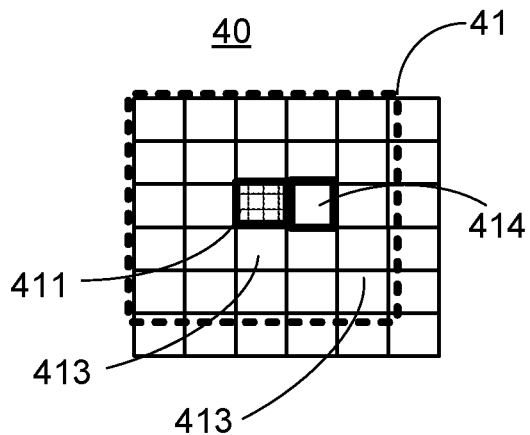
FIG. 12A is a schematic diagram illustrating a scan window in the searching region.

FIG. 12A is a schematic diagram illustrating a scan window in the searching region. In FIG. 12A, it is assumed that the searching region 40 includes blocks being arranged in 6 rows and 6 columns.

For the sake of illustration, the block 414 located at the third row and the fourth column in the searching region is assumed to be corresponding to the isolation position. According to the embodiment of the present disclosure, a scan window 41 is repetitively alternatively used to define or select an area in the searching region 40.

In FIG. 12A, the scan window 41 is centered at an inner block 411, and whether the inner block 411 is corresponding to an isolation position is identified by the first-frame candidate circuit 3811 and/or the second-frame candidate circuit 3813. The inner block 411 is respectively alternatively selected from the 6*6 blocks in the searching region 40. The size of the scan window 41 is assumed to be 5*5 blocks, but it may vary in practical application.

The blocks being included by the scan window 41 can be classified into two groups, the inner block 411 and some neighbor blocks 413. The inner block 411 is surrounded by the neighbor blocks 413. In practical application, the neighbor blocks 413 can further include one or multi-layers of blocks, depending on the distance between the neighbor blocks 413 and the inner block 411. In the context, an example of a two-layer scheme is illustrated.

Figure 12B:
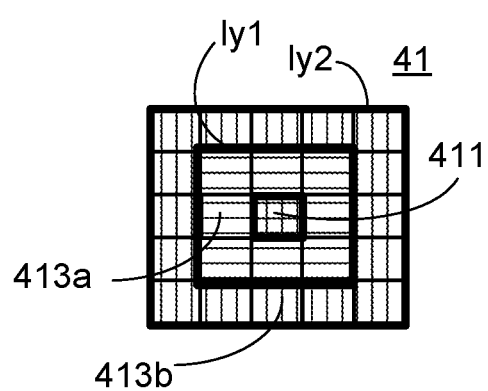
FIG. 12B is a schematic diagram illustrating definitions of blocks in the searching region.
Figure 13:
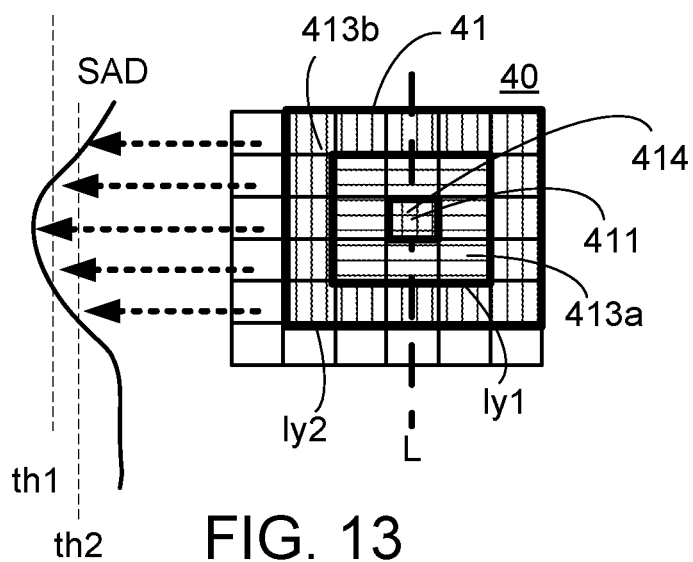
FIG. 13 is a schematic diagram illustrating the determination of isolation positions based on the similarity measure distribution SAD corresponding to the scan window.

FIG. 12B is a schematic diagram illustrating definitions of blocks in the searching region. The neighbor blocks 413 include some layer-one blocks 413a and some layer-two blocks 413b. In FIG. 12B, the layer-one blocks 413a are shown in horizontal screen tone and circled by the layer-one boundary ly1, and the layer-two blocks 413b are shown in vertical screen tone and circled by the layer-two boundary ly2. The inner block 411 is surrounded by the layer-one blocks 413a, and the layer one blocks 41b are surrounded by the layer-two blocks 413b. The layer-one blocks 413a may or may not be adjacent to the inner block 411, and the layer-two blocks 413b may or may not be adjacent to the layer-one blocks 413a, FIG. 13 is a schematic diagram illustrating the determination of isolation positions based on the similarity measure distribution SAD corresponding to the scan window. A cross-sectional line L crossing the blocks located at the fourth column of the searching region 40 and SAD values corresponding to the same blocks are shown.

The block 414 located at the third row and the fourth column in the searching region is assumed to be corresponding to the isolation position, and the SAD value corresponding to the block 414 is a local maximum (isolation position) in the similarity measure distribution SAD. In FIG. 13, the block 414 is selected as the inner block 411.

According to an embodiment of the present disclosure, a layer-one condition and a layer-two condition are defined. The layer-one condition is related to a first similarity threshold th1, and the layer-two condition is related to a second similarity threshold th2.

The first similarity threshold th1 is defined based on a first ratio (r1) times SAD value corresponding to the inner block 411 (SADin), that is, th1=r1*SADin. The second similarity threshold th2 is defined based on a second ratio (r2) times the SAD value corresponding to the inner block 411 (SADin), that is, th2=r2*SADin. The first ratio (r1) and the second ratio (r2) are less than "1", and the first ratio (r1) is greater than the second ratio (r2), that is, r1>r2. For example, in a case that r1=0.8 and r2=0.6, the first similarity threshold th1 is defined as th1=0.8*SADin and the second similarity threshold th2 is defined as th2=0.6*SADin.

Each of the layer-one blocks 413a is repetitively and alternatively selected and whose SAD values are compared with the first similarity threshold th1, respectively. Only if the SAD values of all the layer-one block 413a are less than or equivalent to the first similarity threshold th1, the layer-one condition is determined to be met.

Each of the layer-two blocks 413b is repetitively and alternatively selected and whose SAD values (SADf2) are compared with the first similarity threshold, respectively. Only if the SAD values of all the layer-two blocks 413b (SADf2) are less than or equivalent to the second similarity threshold th2, the layer-two condition is determined to be met.

Comparing with the layer-two blocks 413b, the layer-one blocks 413a are relatively close to the inner block 411. Therefore, in a case that the inner block 411 is actually corresponding to the isolation position, the SAD values of the layer-one blocks 413a must be greater than those of the layer-two blocks 413b. Thus, the first similarity threshold th1 is greater than the second similarity threshold th2, that is, th1>th2.

Figure 14:
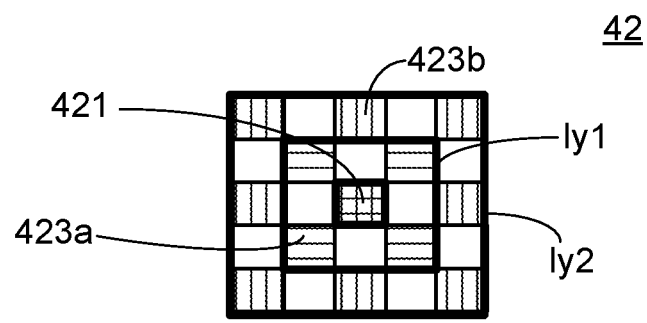
FIG. 14 is a schematic diagram illustrating that only some of the neighbor blocks are selected for comparison.

FIG. 14 is a schematic diagram illustrating that only some of the blocks in the searching region are selected for determining satisfaction of the layer-one condition and/or layer-two condition. For the sake of efficiency, not all the layer-one blocks are required to be compared with the inner-block 421, and not all layer-two blocks are required to be compared with the inner-block in practical application.

For example, in FIG. 14, the grids having horizontal screen tone represent the layer-one blocks 423a whose SAD values are selected for comparing with the first similarity threshold th1 and determining whether the layer-one condition is satisfied; and the grids having vertical screen tone represent the layer-two blocks 423b whose SAD values are selected for comparing with the second similarity threshold th2 and determining whether the layer-two condition is satisfied.

Figure 15:
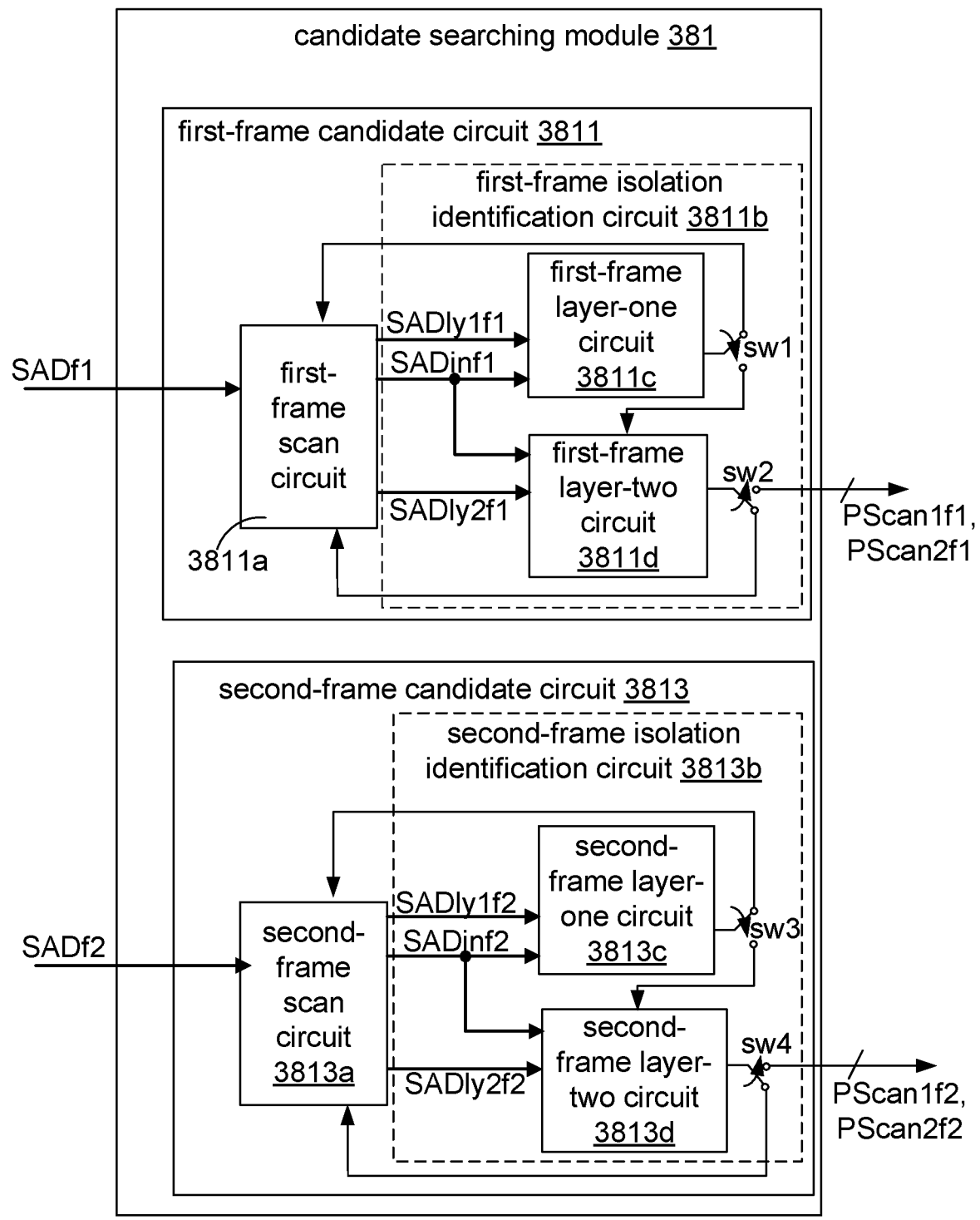
FIG. 15 is a block diagram illustrating the candidate searching module using two similarity measure distributions SAD according to an embodiment of the present disclosure.

FIG. 15 is a block diagram illustrating the candidate searching module using two similarity measure distributions SAD according to an embodiment of the present disclosure.

The first-frame candidate circuit 3811 includes a first-frame scan circuit 3811a and a first-frame isolation identification circuit 3811b, which are electrically connected to each other. The first-frame scan circuit 3811a is configured for repetitively alternatively selecting the scan window in the first frame f1.

After receiving the first-frame similarity measure distribution SADf1, the first-frame scan circuit 3811a acquires and transmits the SAD value corresponding to the first-frame inner block SADinf1, the SAD values corresponding to the first-frame layer-one blocks SADly1/1, and the SAD values corresponding to the first-frame layer-two blocks SADly2/1 to the first-frame isolation identification circuit 3811b.

The first-frame isolation identification circuit 3811b is configured for verifying if the first-frame inner block in the selected scan window in the first frame f1 includes any of the first-frame candidate positions or not. The first-frame isolation identification circuit 3811b further includes a first-frame layer-one circuit 3811c, a first-frame layer-two circuit 3811d, and switches sw1, sw2. The first-frame layer-one circuit 3811c receives the SAD values corresponding to the first-frame inner block SADinf1 and the first-frame layer-one blocks SADly1/1 to determine if the first-frame layer-one condition is satisfied.

According to an embodiment of the present disclosure, the first-frame inner block 411 is confirmed to be corresponding to the candidate position only if both the first-frame layer-one condition and the first-frame layer-two condition are satisfied.

Once the first-frame layer-one condition is not satisfied, the first-frame layer-two circuit 3811d no longer needs to check if the first-frame layer-two condition is satisfied. In such case, through conduction of the switch sw1, the first-frame layer-one circuit 3811c informs the first-frame scan circuit 3811a that the first-frame inner block 411 in the first scan window under inspection does not include the first-frame candidate positions PScan1/1, PScan2/1. Consequentially, the first-frame scan circuit 3811a will select another first-frame inner block 411 in the first-frame searching region 281a and the first-frame candidate circuit 3811 will initiate another round of inspection/verification.

Alternatively, if the first-frame layer-one condition is satisfied, the first-frame layer-two circuit 3811d needs to further determine if the first-frame layer-two condition is satisfied. In such case, the switch sw1 conducts the determination result of the first-frame layer-one circuit 3811c to the first-frame layer-two circuit 3811d to inform the first-frame layer-two circuit 3811d, Then, the first-frame layer-two circuit 3811d continues the inspection and determines if the first-frame layer-two condition is satisfied based on comparisons between the SAD value corresponding to the first-frame inner block SADinf1 and the the SAD values corresponding to the first-frame layer-two blocks SADly2/1.

Once the first-frame layer-two condition is not satisfied, through conduction of the switch sw2, the first-frame layer-two circuit 3811d informs the first-frame scan circuit 3811a that the first-frame inner block 411 in the first scan window under inspection does not include the first-frame candidate positions PScan1/1, PScan2/1. Consequentially, the first-frame scan circuit 3881 will select another first-frame inner block 411 in the first-frame searching region 281a and the first-frame candidate circuit 3811 will initiate another round of inspection.

When both the first-frame layer-one condition and the first-frame layer-two condition are satisfied, the first-frame candidate circuit 3811 can accordingly confirm that the first-frame inner block 411 includes at least one of the first-frame candidate positions PScan1/1, PScan2F1. Thus, the switch sw2 conducts the determination result of the first-frame layer-two circuit 3811d to the first-frame object selection circuit 3831.

Later, another block in the first-frame f1 is selected as the first-frame inner block for inspection, Once all the blocks in the first-frame searching region have been checked/insepcted by the first-frame candidate circuit 3811, the first-frame candidate positions PScan1/1, PScan2/1 can be identified.

The second-frame candidate circuit 3813 includes a second-frame scan circuit 3813a and a second-frame isolation identification circuit 3813b, which are electrically connected to each other. The second-frame scan circuit 3813a is configured for repetitively alternatively selecting the second scan window, and the second-frame isolation identification circuit 3813b is configured for verifying if the second-frame inner block is corresponding to any of the second-frame candidate positions PScanf2 or not.

The second-frame isolation identification circuit 3813b further includes a second-frame layer-one circuit 3813c, a second-frame layer-two circuit 3813*d*, and switches sw3, sw4. Operations of the second-frame scan circuit 3813*a*, the second-frame layer-one circuit 3813*c*, and the second frame layer-two circuit 3813*d* and conductions of the switches sw3, sw4 can be analogized to their counterparts in the first-frame candidate circuit 3811, and detail explanations are omitted.

Figure 16:
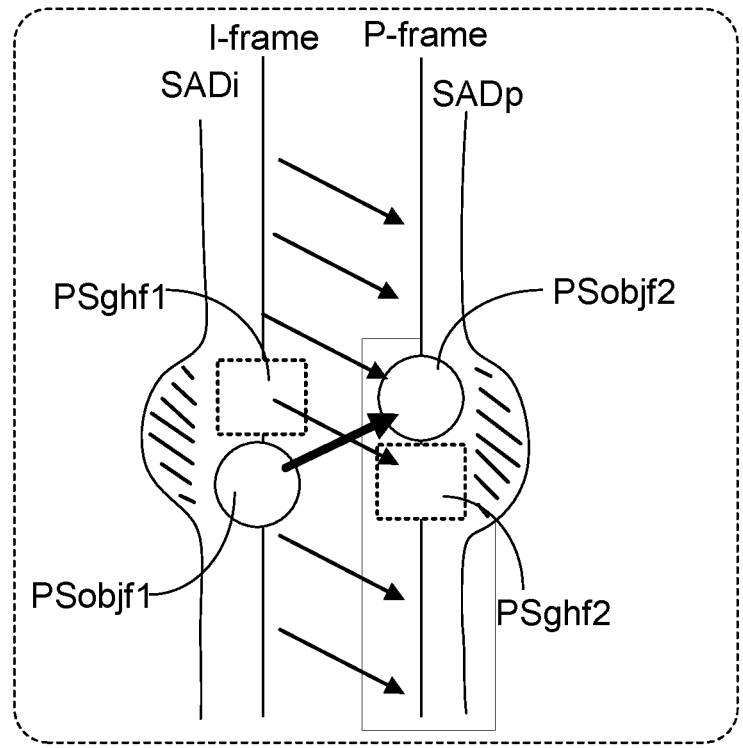
FIG. 16 is a schematic diagram illustrating slowly moving object OBJ may result in an erroneous determination of the isolation position.

FIG. 16 is a schematic diagram illustrating the slowly moving object may result in an erroneous determination of the isolation position. In some occasions, the object motion vector MVobj may be minor (that is, movement of the object OBJ is slow) such that only one isolation position exists in the first frame f1 and one isolation position exists in the second frame f2.

Consequentially, the SAD value of the layer-one block may be very close to the SAD value of the first-frame/second-frame inner block so that the SAD value of the first-frame/second-frame layer-one block is determined to be greater than or equivalent to the first similarity threshold th1. Furthermore, the first-frame/second-frame layer-one condition will be determined to be unsatisfied.

In other words, the minor object motion vector MVobj may affect the determination result. To prevent the case in FIG. 16 to be mistakenly considered as there is no isolation position, FIG. 17 further provides an exception tolerance condition.

Figure 17:
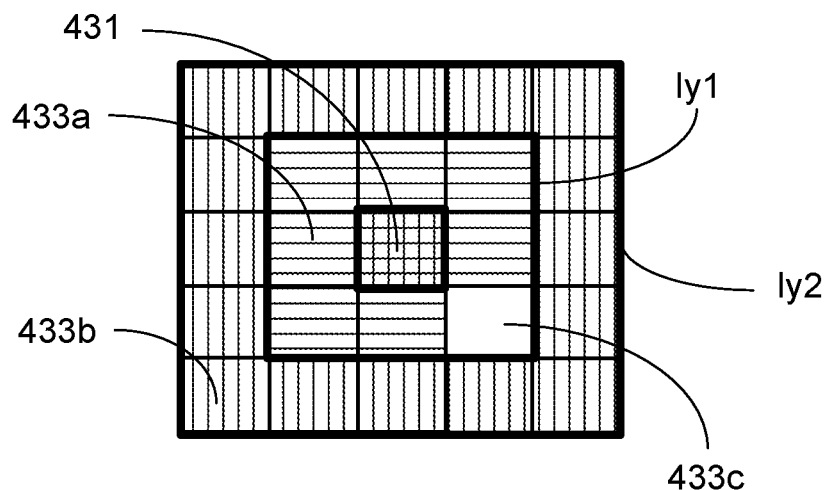
FIG. 17 is a schematic diagram illustrating determination tolerance of the comparison condition for recognizing the slowly moving object OBJ.

FIG. 17 is a schematic diagram illustrating determination tolerance of the comparison condition for recognizing the slowly moving object. In FIG. 17, the layer-one blocks 433*a* are shown in horizontal screen tone except the layer-one block 433*c* located at the right-down side of the inner block 431. That is, the blank grid represents an exception of the layer-one condition, and the first similarity threshold th1 is not necessary to be greater than the SAD value of the layer-one block 433*c*.

According to the embodiment of the present disclosure, an exception tolerance of the first-frame/second-frame layer-one condition is provided. The exception tolerance allows the first-frame/second-frame candidate circuits 3811, 3813 to generate the first-frame/second-frame candidate positions even if one (or more) of the comparisons between the SAD values of the first-frame/second-frame inner block and SAD values of the first-frame/second-frame layer-one blocks is (are) not satisfied with the requirement of SAD comparisons defined in the first-frame/second-frame layer-one condition. In practical application, the number of the first-frame/second-frame layer blocks being as the exception of the layer-one condition and relative position between the first-frame/second-frame layer block being selected for exception and the first-frame/second-frame inner block may vary.

Figure 18:
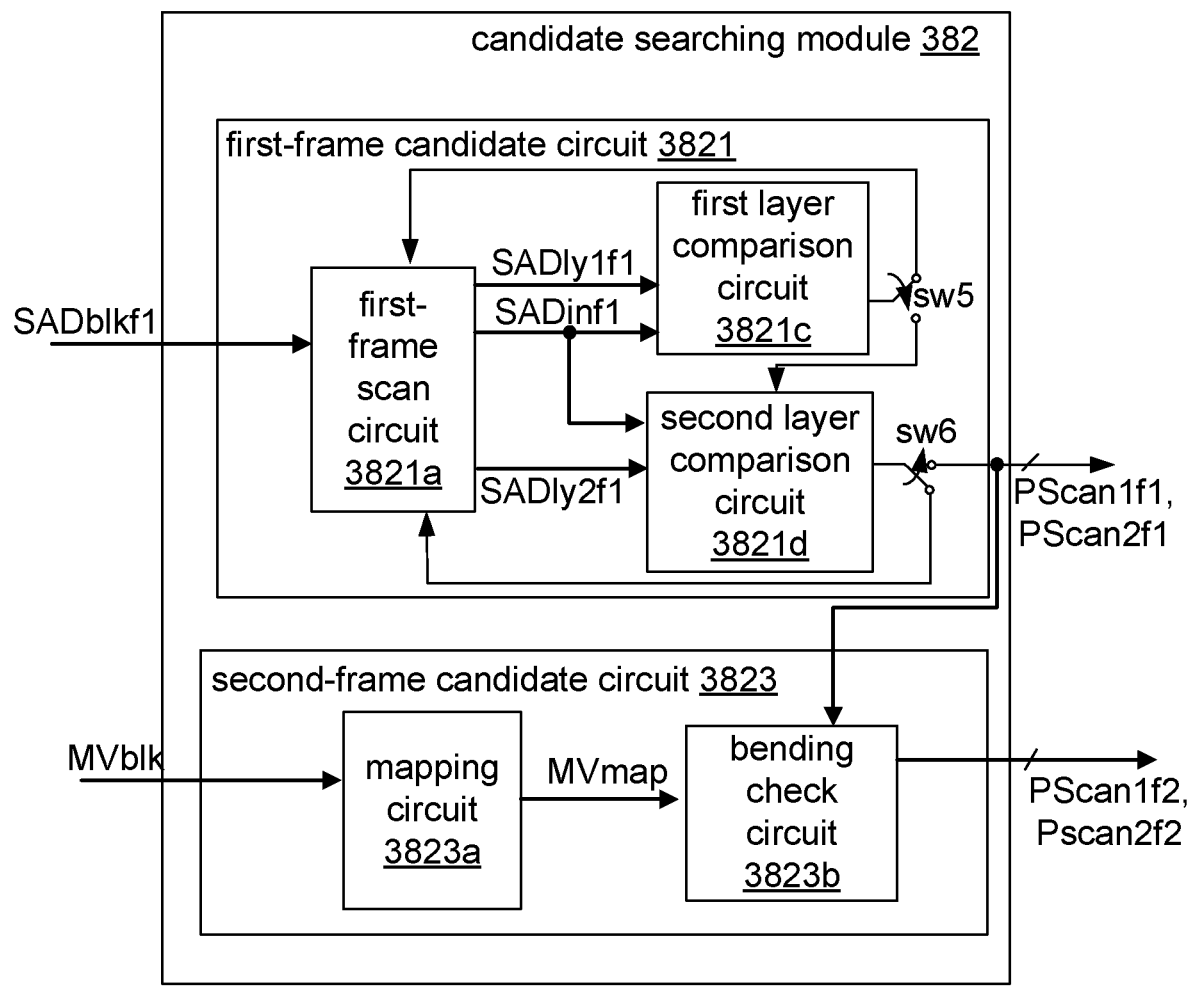
FIG. 18 is a block diagram illustrating the candidate searching module using similarity measure distribution SAD and hit map statistic according to an embodiment of the present disclosure.

In addition to similarity measure distribution SAD, the motion vector mapping can be utilized to identify the location of the candidate positions in the second frame. FIGS. 18, 19A and 19B are examples related to how the motion vector mapping is used for locating candidate positions.

FIG. 18 is a block diagram illustrating the candidate searching module using similarity measure distribution SAD and hit map statistic according to an embodiment of the present disclosure. A candidate searching module 382 including a first-frame candidate circuit 3821 and a second-frame candidate circuit 3823 is shown. The components and operations of the first-frame candidate circuit 3821 are similar to the candidate searching circuit 381 in FIG. 15, and detail explanations are omitted to avoid redundancy.

In some application, the second-frame movement characteristic includes inter-frame motion vectors representing the movement of image content between first-frame blocks and second-frame blocks. The second-frame candidate circuit 3823 includes a mapping circuit 3823*a* and a bending check circuit 3823*b*.

The mapping circuit 3823*a* compiles statistics of the background motion vectors MVbg to generate a motion vector mapping corresponding to the second-frame MVmapf2. The bending check circuit 3813*b* is electrically connected to the mapping circuit 3823*a*. The bending check circuit 3823*b* identifies the second-frame candidate positions PScanf2 based on determining if any of the second-frame blocks is not mapped by the background motion vectors MVbg according to the motion vector mapping (hit map statistic) corresponding to the second-frame MVmapf2.

FIG. 19A is a schematic diagram illustrating how the hit map statistic is utilized to determine the second-frame object position PSobjf2 when the smoothness constraint of the spatial motion vector MVsp is weak. In FIGS. 19A and 19B, numbers next to P-frame represent that whether the second-frame blocks are pointed by the background motion vector MVbg.

When the smoothness constraint of the spatial motion vector MVsp is weak, directions of the motion vectors originated from the candidate positions in the first frame f1 are not necessary to be consistent with the background motion vectors MVbg originated from other first-frame blocks which are close to the first-frame object position PSobjf1 and the first-frame camouflage position PSghf1. In consequence, two of the second-frame blocks are not corresponding to the background motion vector MVbg.

As shown in FIG. 19A, most of the second-frame blocks are corresponding to the number "1", the second-frame block next to the second-frame object position PSobjf2 is corresponding to the number "2", and the second-frame object position PSobjf2 and the second-frame camouflage position PSghf2 are corresponding to the number "0".

Therefore, the bending check circuit 3813*b* can locate the second-frame candidate positions PScan1/2, PScan2/2 by finding which of the second-frame blocks are not pointed by the background motion vector MVbg when the smoothness constraint of the spatial motion vector MVsp is weak.

FIG. 19B is a schematic diagram illustrating how the hit map statistic is utilized to determine the second-frame object position PSobjf2 when the smoothness constraint of the spatial motion vector MVsp is strict.

When the smoothness constraint of the spatial motion vector MVsp is strict, the motion vector originated from the first-frame camouflage position PSghf1 is not consistent with the background motion vectors MVbg originated from other first-frame blocks. On the other hand, the first-frame object position PSobjf1 must be consistent with background motion vector MVbg. In consequence, only one of the second-frame blocks is not corresponding to the background motion vector MVbg, and the second-frame block not corresponding to the motion vector MVbg includes the object OBJ.

As shown in FIG. 19B, most of the second-frame blocks are corresponding to the number "1", the second-frame block next to the second-frame object position PSobjf2 is corresponding to the number "2", and the second-frame object position PSobjf2 is corresponding to the number "0".

Unlike FIG. 19A, the second-frame camouflage position PSghf2 in FIG. 19B is not corresponding to the number "0". Therefore, the bending check circuit 3813*b* can directly locate the second-frame object position PSobjf2 when the smoothness constraint of the spatial motion vector MVsp is strict.

FIG. 20 is a schematic block diagram illustrating four different motion vectors can be obtained according to the first-frame candidate positions and the second-frame candidate positions. The output of the candidate searching module 381 includes two first-frame candidate positions PScan1/1, PScan2/1, and two second-frame candidate positions PScan1/2, PScan2/2, and combinations of which jointly form four possible motion vectors, as the dotted arrows shown in FIG. 20.

To find the object motion vector MVobj among the four possible motion vectors, the actual position of the object in the first frame f1 (that is, the first-frame object position PSobjf1) and the actual position of the object in the second frame f2 (that is, second-frame object position PSobjf2) need to be identified.

Details about how the movement detection circuit 333 recognizes which of the two isolation positions in I-frame is corresponding to the object position in I-frame PSobjf1, and which of the two positions in P-frame is corresponding to the object position in P-frame PSob f2 are illustrated with FIGS. 21,22,23.

FIG. 21 is a schematic block diagram trating the object selection module. The object selection module 383 includes a first-frame object selection circuit 3831 and a second-frame object selection circuit 3833. The first-frame object selection circuit 3831 further includes a position matching circuit 3831a and an object position selector 3831b. The second-frame object selection circuit 3833 further includes an MV calculation circuit 3833a and an MV comparator 3833b.

The first-frame object selection circuit 3831 is configured for receiving the first-frame candidate positions (PScan1/1, PScan2/1) and the second-frame object position at the previous time PSobjf2(n−1), and accordingly generating the first-frame object position PSobjf1. The relationship between signals related to the first-frame object selection circuit 3831 will be illustrated in FIG. 22.

The first-frame object position PSobjf1 is transmitted to the motion vector calculation circuit 37 and the second-frame object selection circuit 3833. After receiving the first-frame object position PSobjf1 and the second-frame candidate positions (PScan1/2, PScan2/2), the second-frame object selection circuit 3833 selects one of the second-frame candidate positions (PScan1/2, PScan2/2) as the second-frame object position PSob f2. The relationship between signals related to the second-frame object selection circuit 3833 will be illustrated in FIG. 23.

FIGS. 22 and 23 are related to operations of the first-frame object selection circuit 3831 and the second-frame object selection circuit 3833, respectively.

FIG. 22 is a schematic diagram illustrating how the first-frame object position PSobjf1 is selected from the first-frame candidate positions PScanf1. Please refer to FIGS. 21 and 22 together.

In FIG. 22, the similarity measure distribution SADp(n−1) corresponding to the second frame at the previous time P-frame(n−1) and the similarity measure distribution SADi(n) corresponding the first-frame at the current time I-frame (n) are listed side-by-side and can be easily compared.

As illustrated above, the second-frame f2 at the previous time t(n−1) is utilized as the first-frame f1 at the current time t(n). Thus, the object OBJ locates at the same position in the second-frame f2 at the previous time t(n−1) and the first-frame f1 at the current time t(n). The similarity measure distribution SADp(n−1) shows a second-frame object position at the previous time PSobjf2(n−1) and a second-frame camouflage position at the previous time PSghf2(n−1), and the second-frame object position at the previous time PSobjf2(n−1) is utilized to determine the first-frame object position at the current time PSobjf1(n).

By comparing the isolation positions in the similarity measure distributions corresponding to P-frame at the previous time SADp(n−1) and the similarity measure distribution corresponding to I-frame at the current time SADi(n), the first-frame object position at the current time PSobjf1(n) can be quickly found.

Practical implementation of the first-frame object selection circuit 3831 may vary. According to the embodiment of the present disclosure, in order to recognize the first-frame object position PSobjf1, the first-frame object selection circuit 3831 can acquire the similarity measure distribution corresponding to the second frame at the previous time SADf2(n−1) to compare with the first-frame similarity measure distribution at the current time SADf1(n), or directly acquire the second-frame object position PSobjf2(n−1) at the previous time t(n−1) to compare with the first-frame candidate positions (PScan1/1, PScan2/2) at the current time t(n).

In practical application, the position matching circuit 3831a can compare the second-frame object position at the previous time PSobjf2(n−1), and the first first-frame candidate position PScan1/1, and accordingly generates a first comparison result Scmp1.

If the first comparison result Scmp1 shows that second-frame object position at the previous time PSobjf2(n−1) is the same as the first first-frame candidate position PScan1/1, the object position selector 3831b directly confirms the first first-frame candidate position PScan1/1 is the first-frame object position PSobjf1 (as FIG. 22 shows).

Once the first-frame object position PSobjf1 is recognized, the second-frame object selection circuit 3833 can refer to the first-frame object position PSobjf1 to identify which of the two second-frame candidate positions PScan1/2, PScan2/2 is the second-frame object position PSobjf2.

FIG. 23 is a schematic diagram illustrating how the second-frame object position PSobjf2 is selected from the first second-frame candidate position PScan1/2 and the second second-frame candidate position PScan2/2 Please refer to FIGS. 21 and 23 together.

The MV calculation circuit 3833a calculates a first emulated motion vector MVemu1 and a second emulation motion vector MVemu2. The first emulated motion vector MVemu1 is calculated based on the first-frame object position PSobjf1 and the first second-frame candidate position PScan1/2. The second emulated motion vector MVemu2 is calculated based on the first-frame object position PSobjf1 and the second second-frame candidate position PScan2/2.

As the movement detection circuit 333 intends to detect the object motion vector MVobj, and the object motion vector MVobj is distinct from the background motion vector MVbg. The first and the second emulated motion vectors MVemu1, MVemu2 are respectively compared with the background motion vector MVbg, and one of the second-frame candidate positions PScan1/2, PScan2/2 whose corresponding emulated motion vector MVemu1, MVemu2 is equivalent to the background motion vector MVbg is confirmed to be the second-frame camouflage position PSghf2.

When the MV comparator 3833b confirms that the first emulated motion vector MVemu1 is not equivalent to the background motion vector MVbg and the second emulated motion vector MVemu2 is equivalent to the background motion vector MVbg, the second-frame object selection circuit 3833 verifies the first second-frame candidate position PScan1f2 as the second-frame object position PSobjf2 and the second second-frame candidate position PScan2f2 as the second-frame camouflage position PSghf2.

Alternatively, when the MV comparator 3833b confirms that the first emulated motion vector MVemu1 is equivalent to the background motion vector MVbg and the second emulated motion vector MVemu2 is not equivalent to the background motion vector MVbg, the second-frame object selection circuit 3833 verifies the first second-frame candidate position PScan1f2 as the second-frame camouflage position PSghf2 and the first second-frame candidate position PScan1f2 as the second-frame object position PSobjf2.

FIG. 24 is a schematic diagram illustrating the calculation of the object motion vector. Once the first-frame object position PSobjf1 and the second-frame object position PSobjf2 are recognized, the motion vector calculation circuit 37 can directly calculate a difference between the first-frame object position PSobjf1 and the second-frame object position PSobjf2 to obtain the object motion vector MVobj.

As mentioned above, the example in the context assumes that the first frame f1 is I-frame and the second frame f2 is P-frame. In practical application, the first frame f1 can be one of I-frame, P-frame, and M-frame, and the second frame f2 can be another one of I-frame, P-frame, and M-frame, FIG. 25 is an example illustrating that similarity measure distribution corresponding to M-frame SADph can be utilized to locate the candidate positions as well.

Figure 25:
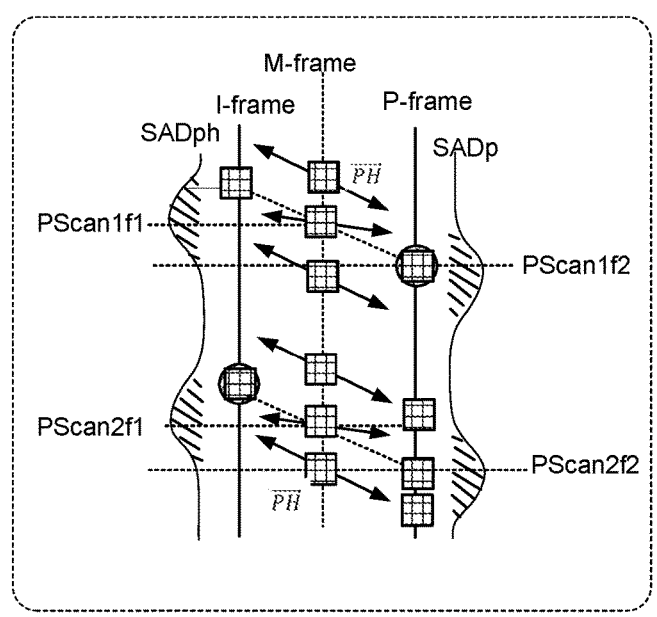
FIG. 25 is a schematic diagram illustrating that M-frame and bidirectional motion vectors can be used for detecting the object motion vector MVobj.

FIG. 25 is a schematic diagram illustrating that M-frame and bidirectional motion vectors can be used for detecting the object motion vector MVobj. In FIG. 25, the relative positions of the first-frame object position, the first-frame camouflage position, the second-frame object position, and the second-frame camouflage position are similar to the ones in FIG. 9, and the similarity measure distribution SAD corresponding to M-frame is shown on the left side.

The similarity measure distribution SAD corresponding to M-frame can be obtained by the phase motion vectors MVph generated. Similar to the previously illustrated example, the similarity measure distribution SAD corresponding to M-frame also includes two isolation positions, which can be used to identify positions of the object in I-frame and P-frame.

Nevertheless, although the isolation positions in similarity measure distribution corresponding to M-frame SADph are slightly from the ones in similarity measure distribution corresponding to I-frame SADi, the position difference between the I-frame and the M-frame can be calculated and compensated by the phase motion vectors MVph. Thus, the calculation based on the M-frame can still be used to recognize the object positions in I-frame and F-frame correctly.

Figure 26:
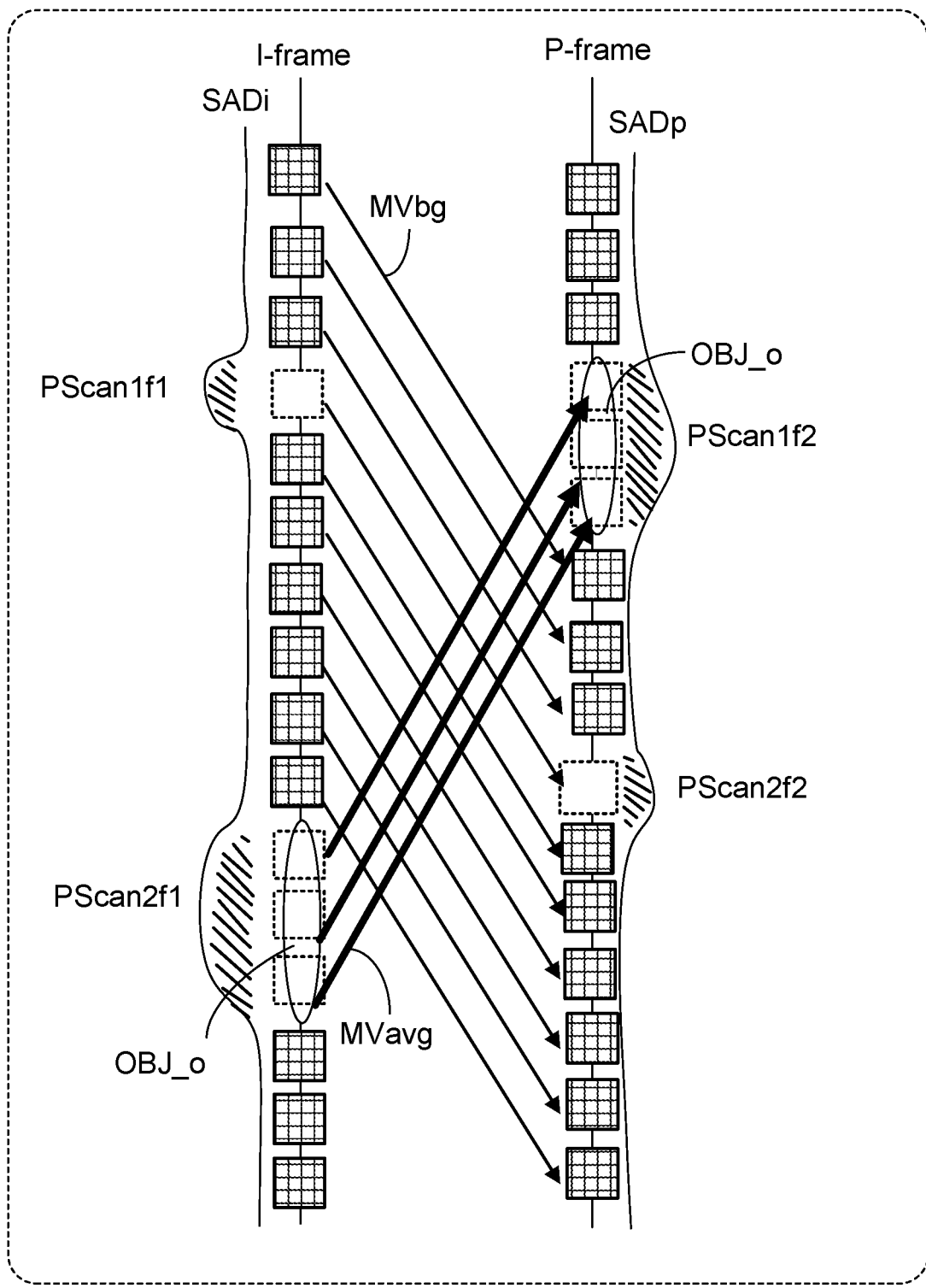
FIG. 26 is a schematic diagram illustrating that an occlusion object OBJ_o may cause a similar phenomenon in similarity measure distribution SAD as the small object OBJ_s does.

FIG. 26 is a schematic diagram illustrating an occlusion object OBJ_o may have a similar phenomenon in similarity measure distribution SAD as a small object OBJ_s does. In some applications, movement of an occlusion object OBJ_o may have similarities to the movement of a small object OBJ_s.

As shown in FIG. 26, the similarity measure distributions SADi and SADp are similar to the ones shown in FIG. 9. That is, when the object OBJ is the occlusion object OBJ_o, two isolation positions exist in similarity measure distribution SADi and another two isolation positions exit in similarity measure distribution SADp as well.

Thus, when the occlusion object OBJ_o exists and causes the similarity measure distributions SADi and SADp having the distribution shape shown FIG. 26, the two isolation positions in the similarity measure distribution corresponding to I-frame SADi might be recognized as the first-frame candidate positions PScan1/1, PScan2/1, and the two isolation positions in the similarity measure distribution corresponding to P-frame SADp might be recognized as the second-frame candidate positions PScan1f2, PScan2f2, Under such circumstances, the following processing being performed by the object selection module 383 and the motion vector calculation circuit 37 may mistakenly recognize the occlusion object motion vector MVobj_o as the small object motion vector MVobj_s.

Therefore, a function capable of identifying whether the object motion vector MVobj is caused by the occlusion object OBJ_o or the small object OBJ_s and further eliminating the occlusion object motion vector MVobj_o is required.

Figure 27:
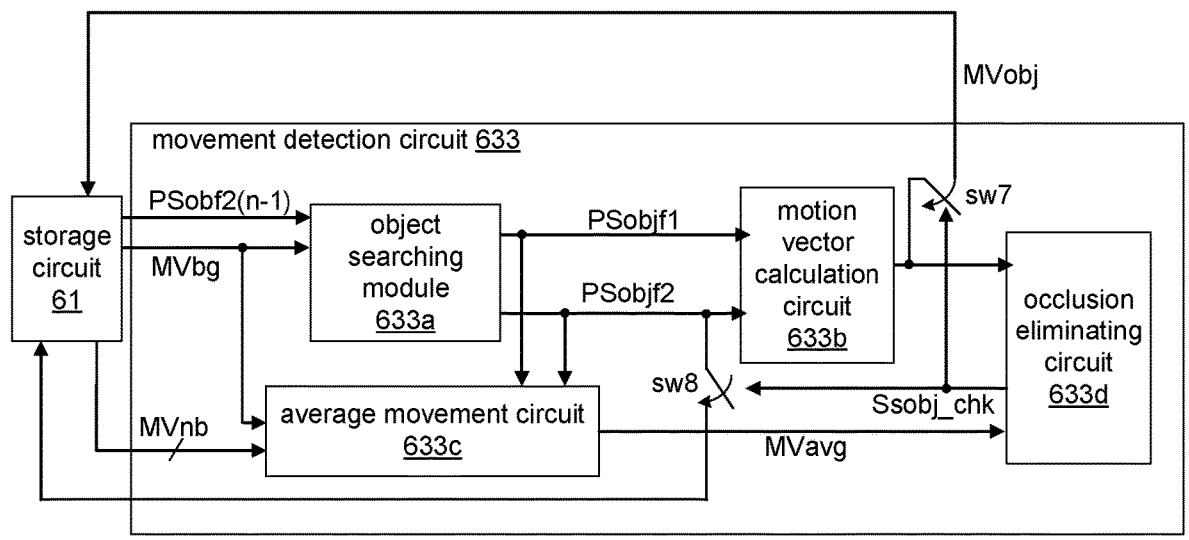
FIG. 27 is a block diagram illustrating that an occlusion eliminating circuit is used for eliminating determination that the occlusion object OBJ_o is mistakenly recognized as the small object OBJ_s.

FIG. 27 is a block diagram illustrating that an occlusion eliminating circuit is used for eliminating determination that the occlusion object OBJ_o is mistakenly recognized as the small object OBJ_s. In FIG. 27, in addition to the object searching module 633a and the motion vector calculation circuit 633b, an occlusion eliminating circuit 633d and an average movement circuit 633c are provided.

The average movement calculation circuit 633c is electrically connected to the object searching module 633a and the motion vector calculation circuit 633b. The average movement calculation circuit 633c calculates an average motion vector MVavg based on motion vectors corresponding to blocks nearby the isolation position (nearby motion vectors). Specifically, the average motion vector MVavg is used to represent the movements corresponding to some of the first-frame blocks which are close to (nearby) the first-frame object position PSobjf1, and some of the second-frame blocks which are close to (nearby) the second-frame object position PSobf2.

The occlusion eliminating circuit 633d is electrically connected to the motion vector calculation circuit 633b and the average movement circuit 633c. The occlusion eliminating circuit 633d verifies whether the object OBJ is the small object OBJ_s by comparing the object motion vector MVobj with the average motion vector MVavg.

Theoretically, the small object OBJ_s includes fewer pixels. Thus, in case that the object motion vector MVobj is corresponding to the small object OBJ_s (that is, a small object motion vector MVobj_s), the object motion vector MVobj of the block comprising the small object OBJ_s must be different from motion vectors of its neighbor blocks. Therefore, in a case that the object motion vector MVobj is consistent with the average motion vector MVavg, the occlusion eliminating circuit 633d identifies the isolation position is not caused by the small object OBJ_s but the occlusion object OBJ_o.

The occlusion eliminating circuit 633d generates an occlusion determination result Ssobj_chk to control the switches sw7, sw8.

When the average motion vector MVavg is inconsistent with the object motion vector MVobj, the occlusion determination result Ssobj_chk represents the object OBJ being detected is the small object OBJ_s. In such case, switches s7 and s8 are both turned on, and the object motion vector MVobj and the second-frame object position PSobjf2w are stored in the storage circuit 61.

When the average motion vector MVavg is consistent with the object motion vector MVobj, the occlusion determination result Ssobj_chk represents the object OBJ being the occlusion object OBJ_o. In such case, switches s7 and s8 are both turned off, and the object motion vector MVobj and the second-frame object position PSobjf2w are discarded.

According to the embodiments of the present disclosure, the movement detection circuit can detect the object motion vector MVobj, and further recognize whether the object is the small object OBJ_s or the occlusion object OBJ_o with the occlusion eliminating circuit. As the small object motion vector MVobj_s can be accurately recognized, the motion compensation circuit can smoothly construct and display the small object OBJ_s in the background in M-frames.

In conclusion, the movement detection circuit, the motion estimation circuit, and the movement detection method provided by the present disclosure are capable of detecting the movement of the object OBJ. Moreover, whether the object OBJ is the small object OBJ_s or the occlusion object OBJ_o can be recognized effectively. Therefore, the possibility of the disappearance of the small object OBJ_s can be reduced. The design of the movement detection circuit is flexible in many aspects. For example, the design of the exception condition for recognizing layer-one block can be used to recognize small object OBJ_s which moves slowly. Or, satisfaction criteria of the layer one/two conditions can be freely adjusted in response to different features of the video to accelerate the processing speed.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A movement detection circuit for detecting movement of an object in continual frames, comprising:
    a candidate searching module, comprising:
        a first-frame candidate circuit, for locating a first first-frame candidate position and a second first-frame candidate position in a first frame based on a first-frame similarity measure distribution at a current time; and
        a second-frame candidate circuit, for locating a first second-frame candidate position and a second second-frame candidate position in a second frame based on a second-frame movement characteristic at the current time;
    an object selection module, electrically connected to the candidate searching module, comprising:
    a first-frame object selection circuit, electrically connected to the first-frame candidate circuit, for identifying which of the first and the second first-frame candidate positions is a first-frame object position representing a position of the object in the first frame according to the first-frame similarity measure distribution at the current time and another second-frame movement characteristic at a previous time; and
    a second-frame object selection circuit, electrically connected to the second-frame candidate circuit and the first-frame object selection circuit, for identifying which of the first and the second second-frame candidate positions is a second-frame object position representing a position of the object in the second frame according to the first-frame similarity measure distribution and the second-frame movement characteristic; and
    a motion vector calculation circuit, electrically connected to the object selection module, for calculating an object motion vector representing the movement of the object between the first frame and the second frame based on the first-frame and the second-frame object positions.

2. The movement detection circuit according to claim 1, wherein the first-frame candidate circuit comprises:
    a first-frame scan circuit, for repetitively alternatively selecting one of a plurality of first-frame blocks in a first-frame searching region as a first-frame inner block, and identifying a first scan window being centered at the first-frame inner block and a plurality of first-frame neighbor blocks surrounding the first-frame inner block; and
    a first-frame isolation identification circuit, electrically connected to the first-frame scan circuit, for determining whether the first-frame inner block is corresponding to any of the first and the second first-frame candidate positions based on the first-frame similarity measure distribution.

3. The movement detection circuit according to claim 2, wherein the first-frame similarity measure distribution comprises a plurality of first-frame similarity measure results and the plurality of first-frame neighbor blocks include a plurality of first-frame layer-one blocks surrounding and being adjacent to the first-frame inner block, wherein the first-frame isolation identification circuit comprises:
    a first-frame layer-one circuit, electrically connected to the first-frame scan circuit, for determining whether a first-frame layer-one condition is satisfied based on comparisons between one of the plurality of first-frame similarity measure results being corresponding to the first-frame inner block and some of the plurality of first-frame similarity measure results being corresponding to the first-frame layer-one blocks.

4. The movement detection circuit according to claim 3, wherein the plurality of first-frame neighbor blocks further include a plurality of first-frame layer-two blocks being adjacent to the first-frame layer-one blocks, wherein the first-frame isolation identification circuit further comprises:
    a first-frame layer-two circuit, electrically connected to the first-frame scan circuit and the first-frame layer-one circuit, for determining whether a first-frame layer-two condition is satisfied based on comparisons between the one of the plurality of first-frame similarity measure results being corresponding to the first-frame inner block and another some of the plurality of first-frame similarity measure results being corresponding to the first-frame layer-two blocks when the first-frame layer-one condition is satisfied, wherein
    the first-frame candidate circuit determines the first-frame inner block is corresponding to a first-frame isolation position when the first-frame layer-two condition is satisfied.

5. The movement detection circuit according to claim 4, wherein
    the first-frame layer-one condition is related to a first first-frame similarity threshold, the first-frame layer-two condition is related to a second similarity threshold, and the first similarity threshold is greater than the second similarity threshold.

6. The movement detection circuit according to claim 1, wherein the second-frame movement characteristic is a second-frame similarity measure distribution, and the second-frame candidate circuit comprises:
    a second-frame scan circuit, for repetitively alternatively selecting one of a plurality of second-frame blocks in a second-frame searching region as a second-frame inner block, and identifying a second scan window including the second-frame inner block and a plurality of second-frame neighbor blocks neighboring the second-frame inner block; and a second-frame isolation identification circuit, electrically connected to the second-frame scan circuit, for acquiring one of the plurality of second-frame similarity measure results corresponding to the second-frame inner block and some of the plurality of second-frame similarity measure results corresponding to the second-frame neighbor blocks from the second-frame similarity measure distribution, and determining whether the second-frame inner block is corresponding to one of the first and the second second-frame candidate positions based on the plurality of similarity measure results, wherein size of the first-frame searching region is equivalent to size of the second-frame searching region.

7. The movement detection circuit according to claim 1, wherein the second-frame movement characteristic comprises a plurality of inter-frame motion vectors between a plurality of first-frame blocks and a plurality of second-frame blocks, and the second-frame candidate circuit comprises:
a mapping circuit, for compiling the plurality of inter-frame motion vectors to generate a motion vector mapping, and
a bending check circuit, electrically connected to the motion vector mapping circuit, for identifying the first and the second second-frame candidate positions based on determining if any of the plurality of second-frame blocks is not mapped by any of the plurality of estimated motion vectors according to the motion vector mapping.

8. The movement detection circuit according to claim 7, wherein
the bending check circuit locates both the first and the second second-frame candidate positions when a smoothness constraint of motion vector is weak; or
the bending check circuit locates only one the first and the second second-frame candidate positions when the smoothness constraint of motion vector is strict.

9. The movement detection circuit according to claim 1, wherein
the first-frame object selection circuit determines that one of the first and the second first-frame candidate positions is the first-frame object position and the other one of the first and the second first-frame candidate positions is a second-frame camouflage position, and
the second-frame object selection circuit determines that one of the first and the second second-frame candidate positions is the second-frame object position and the other one of the first and the second second-frame candidate positions is a second-frame camouflage position.

10. The movement detection circuit according to claim 9, wherein the first frame is the same as another second frame at the previous time, wherein
the first-frame object selection circuit identifies the first-frame object position and the first-frame camouflage position based on comparing the first and the second first-frame candidate positions with the another second-frame movement characteristic.

11. The movement detection circuit according to claim 9, wherein
the second-frame object selection circuit calculates a first emulated motion vector between the first-frame object position and the first second-frame candidate position, calculates a second emulated motion vector between the first-frame object position and the second second-frame candidate position, and
selects one of the first and the second second-frame candidate positions as the second-frame object position according to the first emulated motion vector and the second emulated motion vector.

12. The movement detection circuit according to claim 11, wherein
the second-frame object selection circuit determines the first second-frame candidate position as the second-frame object position and the second second-frame candidate position as the second-frame camouflage position when the first emulated motion vector is not consistent with the background motion vector and the second emulated motion vector is consistent with the background motion vector; or
the second-frame object selection circuit determines the first second-frame candidate position as the second-frame camouflage position and the first second-frame candidate position as the second-frame object position when the first emulated motion vector is consistent with the background motion vector and the second emulated motion vector is not consistent with the background motion vector.

13. The movement detection circuit according to claim 1, further comprising:
an average movement calculation circuit, electrically connected to the motion vector calculation circuit, for calculating an average motion vector based on a plurality of nearby motion vectors, wherein the plurality of nearby motion vectors represent movements corresponding to some of the plurality of first-frame blocks which are nearby the first-frame object position and some of the plurality of second-frame blocks which are nearby the second-frame object position; and
an occlusion eliminating circuit, electrically connected to the motion vector calculation circuit and the average movement circuit, for verifying whether the object is a small object by comparing the object motion vector with the average motion vector.

14. The movement detection circuit according to claim 13, wherein
the occlusion eliminating circuit verifies the object is the small object, and the movement detection circuit outputs the object motion vector when the object motion vector is not consistent with the average motion vector; or
the occlusion eliminating circuit verifies the object is an occlusion object, and the movement detection circuit discards the object motion vector when the object motion vector is consistent with the average motion vector.

15. The movement detection circuit according to claim 14, wherein the movement detection circuit is electrically connected to a storage circuit, wherein the second-frame object position is saved to the storage circuit when the occlusion eliminating circuit verifies the object motion vector is corresponding to the small object.

16. A motion estimation circuit, comprising:
a background motion vector generator, for generating a plurality of temporal motion vectors related to a plurality of first-frame blocks and a plurality of second-frame blocks, and a plurality of spatial motion vectors related to the plurality of second-frame blocks;
a motion vector selection circuit, electrically connected to the background motion vector generator;
a movement detection circuit, for detecting movement of an object in continual frames, comprising:
a candidate searching module, comprising:
a first-frame candidate circuit, for locating a first first-frame candidate position and a second first-frame candidate position in a first frame based on a first-frame similarity measure distribution at a current time; and a second-frame candidate circuit, for locating a first second-frame candidate position and a second second-frame candidate position in a second frame based on a second-frame movement characteristic at the current time;

an object selection module, electrically connected to the candidate searching module, comprising:

a first-frame object selection circuit, electrically connected to the first-frame candidate circuit, for identifying which of the first and the second first-frame candidate positions is a first-frame object position representing a position of the object in the first frame according to the first-frame similarity measure distribution at the current time and another second-frame movement characteristic; and a second-frame object selection circuit, electrically connected to the second-frame candidate circuit and the first-frame object selection circuit, for identifying which of the first and the second second-frame candidate positions is a second-frame object position representing a position of the object in the second frame according to the first-frame similarity measure distribution and the second-frame movement characteristic; and a motion vector calculation circuit, electrically connected to the object selection module, for calculating an object motion vector representing the movement of the object between the first frame and the second frame based on the first-frame and the second-frame object positions, wherein the object motion vector is transmitted to the motion vector selection circuit and the motion vector selection circuit generates a plurality of selected motion vectors based on the plurality of spatial motion vectors, the plurality of temporal motion vectors, and the object motion vector.

17. The motion estimation circuit according to claim 16, wherein the motion estimation circuit is electrically connected to a motion compensation circuit for generating an interpolated frame based on the plurality of selected motion vectors, the first frame and the second frame.

18. The motion estimation circuit according to claim 16, wherein the first-frame candidate circuit comprises:

a first-frame scan circuit, for repetitively alternatively selecting one of a plurality of first-frame blocks in a first-frame searching region as a first-frame inner block, and identifying a first scan window being centered at the first-frame inner block and a plurality of first-frame neighbor blocks surrounding the first-frame inner block; and a first-frame isolation identification circuit, electrically connected to the first-frame scan circuit, for verifying whether the first-frame inner block is corresponding to any of the first and the second first-frame candidate positions.

19. The motion estimation circuit according to claim 16, wherein the first-frame object selection circuit determines that one of the first and the second first-frame candidate positions is the first-frame object position and the other one of the first and the second first-frame candidate positions is a second-frame camouflage position, and the second-frame object selection circuit determines that one of the first and the second second-frame candidate positions is the second-frame object position and the other one of the first and the second second-frame candidate positions is a second-frame camouflage position.

20. A movement detection method for detecting movement of an object in continual frames, comprising steps of:

locating a first first-frame candidate position and a second first-frame candidate position in a first frame based on a first-frame similarity measure distribution at a current time;

locating a first second-frame candidate position and a second second-frame candidate position in a second frame based on a second-frame movement characteristic at the current time;

identifying which of the first and the second first-frame candidate positions is a first-frame object position representing a position of the object in the first frame according to the first-frame similarity measure distribution and another second-frame movement characteristic at a previous time;

identifying which of the first and the second second-frame candidate positions is a second-frame object position representing a position of the object in the second frame according to the first-frame similarity measure distribution and the second-frame movement characteristic; and calculating an object motion vector representing movement of the object between the first frame and the second frame based on the first-frame and the second-frame object positions.

* * * * *